(12) United States Patent
Trnka

(10) Patent No.: US 9,134,717 B2
(45) Date of Patent: Sep. 15, 2015

(54) SYSTEM FOR MODELING PARALLEL WORKING UNITS FOR ADVANCED PROCESS CONTROL

(75) Inventor: Pavel Trnka, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 714 days.

(21) Appl. No.: 13/341,502

(22) Filed: Dec. 30, 2011

(65) Prior Publication Data

US 2012/0197616 A1 Aug. 2, 2012

(30) Foreign Application Priority Data

Jan. 28, 2011 (EP) .................................... 11152627

(51) Int. Cl.
*G06G 7/48* (2006.01)
*G05B 17/02* (2006.01)

(52) U.S. Cl.
CPC ...................... *G05B 17/02* (2013.01)

(58) Field of Classification Search
CPC .................................. G06G 7/48; G05B 17/02
USPC ............................................................ 703/6
See application file for complete search history.

(56) References Cited

U.S. PATENT DOCUMENTS

| | | | |
|---|---|---|---|
| 5,402,333 A | 3/1995 | Cardner | |
| 5,999,729 A | 12/1999 | Tabloski, Jr. et al. | |
| 2008/0183311 A1* | 7/2008 | MacArthur et al. | ............ 700/29 |
| 2010/0006042 A1* | 1/2010 | Pitonyak et al. | ............ 122/448.3 |
| 2010/0032377 A1* | 2/2010 | Wohlert | ............ 210/652 |

OTHER PUBLICATIONS

Ma Jin, Tong Zhensheng, Yu Rongsheng, "A Real-Time Multi-Loop Model for Evaporation System in Power Plant Simulator" IEEE 2002, pp. 1857-1860.*
Sandberg et al., "Model Reduction of Interconnected Linear Systems," Optimal Control Applications and Methods, vol. 30, pp. 225-245, 2009.

* cited by examiner

*Primary Examiner* — Dwin M Craig
(74) *Attorney, Agent, or Firm* — Seager Tufte & Wickhem LLC

(57) ABSTRACT

An approach for modeling parallel working units of a system for advanced process control. The approach may be a systematic solution based on structured model order reduction. Two phases of it may incorporate model identification and model combination. The first phase is where a model of each parallel unit and a model of the remaining system without any unit may be obtained. The second phase is where the models may be combined to obtain a model of the whole system for any configuration needed by the advanced process control. The model of the whole system may be subjected to a structured model reduction to obtain a reduced order model for the advanced process control.

15 Claims, 42 Drawing Sheets

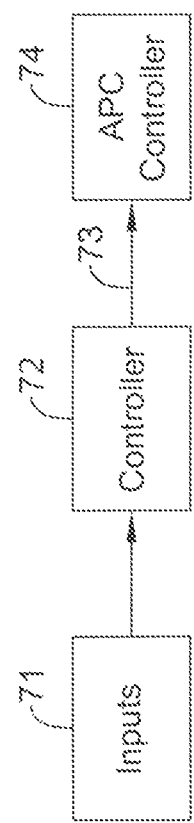

US 9,134,717 B2

SYSTEM FOR MODELING PARALLEL WORKING UNITS FOR ADVANCED PROCESS CONTROL

The present application claims priority to European Patent Application No. 11152627.3, filed Jan. 28, 2011, and entitled "A System for Modeling Parallel Working Units for Advanced Process Control". European Patent Application No. 11152627.3, filed Jan. 28, 2011, is hereby incorporated by reference.

BACKGROUND

The present disclosure pertains to industrial systems and particularly to parallel working units in such systems. More particularly, the disclosure pertains to obtaining models of the units for advanced process control.

SUMMARY

The disclosure reveals an approach for modeling parallel working units of a system for advanced process control. The approach may be a systematic solution based on structured model order (model complexity) reduction. Two phases of it may incorporate model identification and model combination. The first phase is where a model of each parallel unit and a model of the remaining system without any unit may be obtained. The second phase is where the models may be combined to obtain a model of the whole system for any configuration needed by the advanced process control. The model of the whole system may be subjected to a structured model reduction to obtain a reduced order model for the advanced process control.

BRIEF DESCRIPTION OF THE DRAWING

FIG. 2a is a diagram of a controller for processing the workflow of the items in the diagram of FIG. 2 for an example system of FIG. 1;

DESCRIPTION

Control issues in industrial settings may often involve parallel working units, such as: 1) parallel connection of multiple boilers feeding a single header; and 2) parallel working pumps/turbines/chemical reactors/and so forth.

These parallel units may usually be operated in multiple different on/off configurations, where individual units are turned on/off according to process needs and optimal allocation schemes. A design of advanced process control (APC) may require a low order model of the full plant for each on/off configuration. This means that system identification needs to be performed for virtually all of these configurations, which may be rather expensive and time consuming, or even somewhat impossible, since the number of configurations might be in the order of hundreds.

Solutions used in the related art may be either do virtually all identification experiments or identify models of individual parallel units and remaining technology, and combine them to get a low order plant model by using certain heuristics. The last approach may give fairly good results, but often with inconsistent quality and no guarantees.

The present approach may avoid doing identification experiments for virtually all configurations. This approach may replace heuristics and deliver improved models with consistent quality. Models of individual parallel units may be identified separately and then be combined into a global model with a reduced order and an arbitrary on/off configuration by using an algorithm of structure preserving model order reduction.

The present approach may involve an application of a structured order reduction to a related art issue, thus leading to models with high and consistent quality while keeping required experimental time and resources at a minimum. The approach concerns modeling of parallel working units for APC. An algorithm may be noted herein.

Advanced process control (APC) of systems including parallel working units (boilers, turbines, pumps, and so forth) may require a model of system dynamics for each on/off configuration of the parallel units, which can be used during system operation. These models may be obtained by step testing the whole system for every on/off configuration. However, this cannot practically be used for systems having a large number of parallel unit configurations (tens and more).

Figure 1:
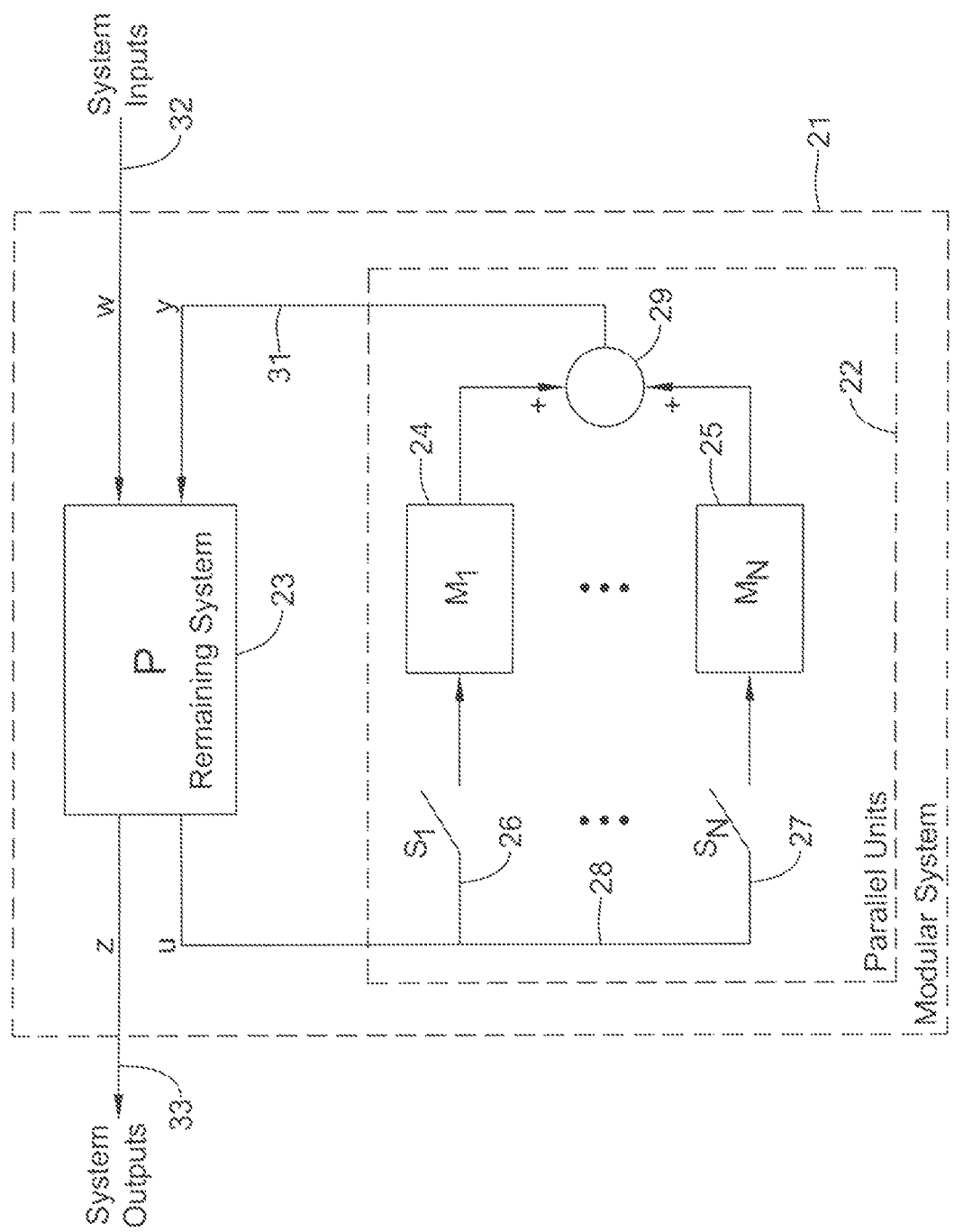
FIG. 1 is a diagram of parallel working units as a part of a larger system.

An issue may be that (due to multiple reasons) the system models for different configurations cannot be obtained by a simple combination of individual unit models $M_i$ and a model of the remaining system P (FIG. 1). The main reason may be that parallel units have to be modeled with a reduced order (controllability issue) under closed loop operation.

Certain heuristics may be used with quite good results but with no guarantees. Also, they need to be tailored for specific systems.

The present approach may be a systematic solution based on structured model order reduction that gives very good and consistent results. Structured model order reduction may be known. FIG. 1 is a diagram of parallel working units as a part of a larger system. Overall a modeled system 21 is shown. Major components may incorporate parallel units 22 and remaining system 23 (P). Parallel units may incorporate a total of an N number of units. Unit 24 ($M_1$) may be the first unit and unit 25 ($M_N$) may be the last unit of an N number of units. There may be N−2 units ($M_i$) (not shown) between the first and last units. Each unit may be connected in series with switch (S). A switch may have symbolical meaning in the Figures. The switch may represent that an appropriate unit can be switched on/off. Physically, the switch may be a valve, boiler coal feeder, and so forth, or just the possibility to shut down or turn on a unit.

A switch 26 ($S_1$) may connected in series with unit 24 and switch 27 ($S_N$) may be connected in series with unit 25. The may be a switch ($S_i$) connected in series with each of the units ($M_i$) situated between the first and last units. The switches may be situated at the inputs of the units. The ends not connected to the inputs of the units may be connected together on line 28 ($u$) which is connected to an output of remaining system 23. The outputs of the units may added at a summer 29. An output line 31 ($y$) of the summed inputs may go to an input of remaining system 23. System 21 inputs ($w$) for model system 21 may be of an input on a line 32 to remaining system 23. System 21 outputs ($z$) may be of an output on a line 33 from remaining system 23.

Figure 2:
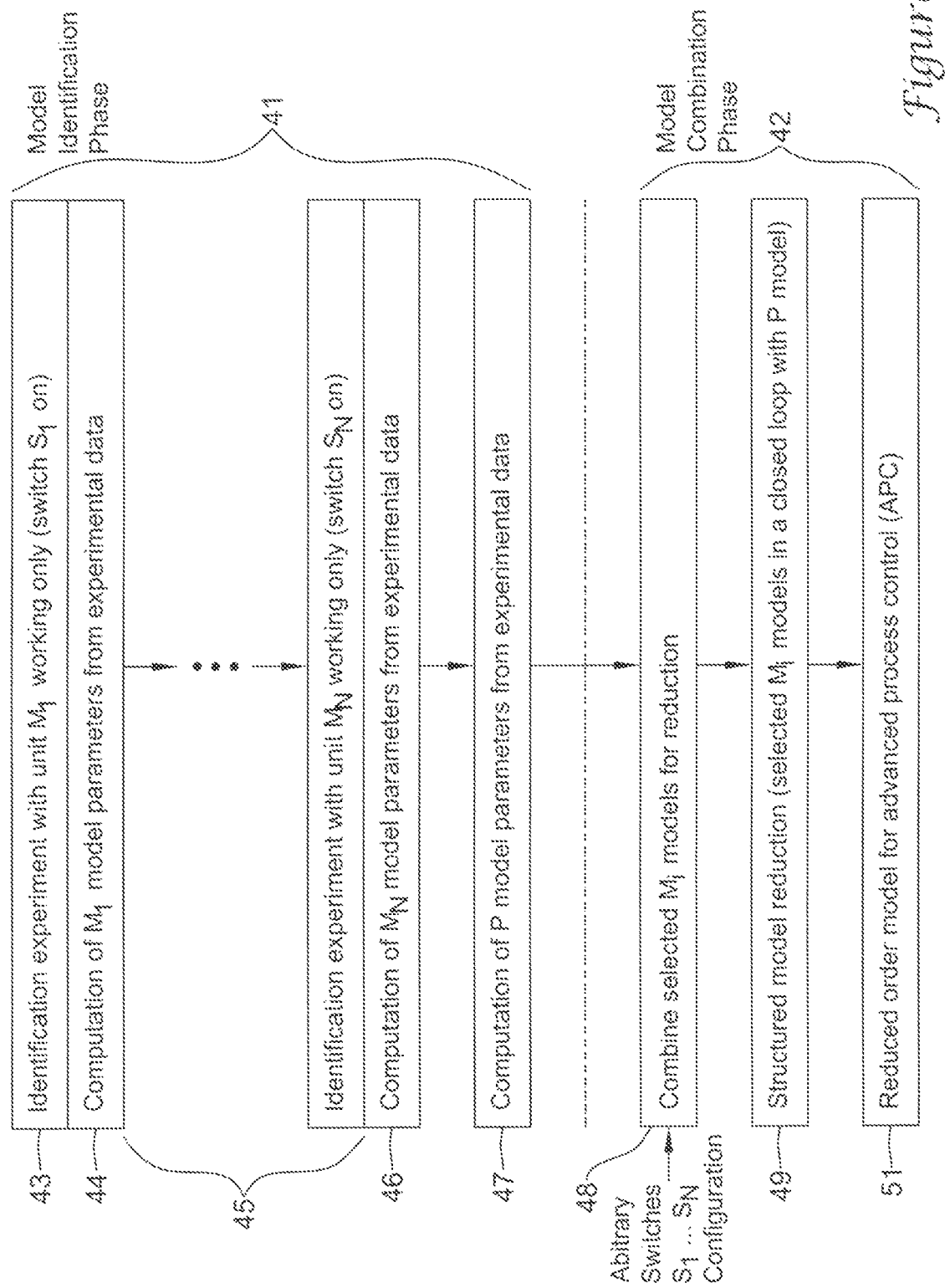
FIG. 2 is a diagram of a workflow with two phases.

FIG. 2 is a diagram of a workflow with two phases. The first phase may be a model identification phase 41, where models of each parallel unit and model of the remaining system are obtained. These results may be used in the second phase 42 (i.e., a model combination phase), where they may be used to get a model of the whole system for any configuration, which is needed by an advanced process control.

A model identification phase may have the following items. A first item 43 may be doing an identification experiment (step testing) with unit 1 enabled (switch $S_1$ on) and other units disabled (switches $S_2, \ldots, S_N$ off). At a second item 44, model parameters may be computed from experimental data and then be used to extract a model of unit $M_1$. Third and fourth items 45 and 46 may repeat the identification experiment for all of the remaining N units (generally always with only one unit enabled). In a fifth item 47, arbitrary previous experimental data may be used to compute parameters of a P model revealing the dynamics of remaining system P. There may be two sources of data for P model parameters. Either it may be possible to identify P model parameters from experiment data for one of individual units (in many cases), or it may be necessary to perform an individual experiment on the "remaining system".

The model combination phase 42 may incorporate an input of an arbitrary configuration of switches $S_1, \ldots, S_N$ (as required by an advanced process control controller) at a sixth item 48 where a parallel combination of enabled models may be computed (according to a configuration of the switches). At a seventh item 49, a structured model order reduction (selected Mi models in a closed loop with a P model) may be applied to the combination of enabled parallel models and a model of the remaining system. The order of parallel models only may be reduced. At an eighth item 51, a result may be a reduced order model for use in an advanced process control controller.

An algorithm may be used in the model combination phase. Assumptions may incorporate known models of individual parallel units $M_1, \ldots, M_N$, and a known model of the remaining system (e.g., the remaining technology) P. Inputs may incorporate a configuration of switches $S_1, \ldots, S_N$.

First, the models of enabled parallel units may be combined to a single state-space model M (according to a configuration of the switches).

$$\dot{x}_M = A_M x_M + B_M u,$$

$$y = C_M x_M + D_M u,$$

where u and y may be parallel units' inputs and summed outputs respectively. Second, the previous model may be combined with the remaining system model, $$\dot{x}_P = A_P x_P + B_{PW} w + B_{PY} y$$

$$z = C_{P1} x_P + D_{PW1} w + D_{PY1} y$$

$$u = C_{P2} x_P + D_{PW2} w + D_{PY2} y$$

to a single model describing the dynamics of the whole system for given switches configuration, $$\begin{pmatrix} \dot{x}_P \\ \dot{x}_M \end{pmatrix} = A \begin{pmatrix} x_P \\ x_M \end{pmatrix} + Bw$$

$$z = C \begin{pmatrix} x_P \\ x_M \end{pmatrix} + Dw$$

where w and z may be the whole system's inputs and outputs, respectively and $$A = \begin{bmatrix} A_P + B_{PY} L D_M C_{P2} & B_{PY} L C_M \\ B_M M C_{P2} & A_M + B_M M D_{PY2} C_M \end{bmatrix},$$

$$B = \begin{bmatrix} B_{PW} + B_{PY} L D_M D_{PW2} \\ B_M M D_{PW2} \end{bmatrix},$$

$$C = C_{P1} + D_{PY1} D_M M C_{P2} D_{PY1} L C_M,$$

$$D = D_{PW1} + D_{PY1} D_M M D_{PW2},$$

$$L := I - D_M D_{PY2}^{-1}, M := I - D_{PY2} D_M^{-1}.$$

The following items may involve a structured model reduction.

Third, controllability Gramian P and observability Gramian Q may be computed for the whole model and separate them according to $x_P$ and $x_M$ dimensions, $$P = \begin{pmatrix} P_M & P_{MP} \\ P_{MP}^T & P_P \end{pmatrix}, Q = \begin{pmatrix} Q_M & Q_{MP} \\ Q_{MP}^T & Q_P \end{pmatrix}.$$

Fourth, the Cholesky factor R of controllability Gramian $P_P = RR^T$ may be computed.

Fifth, the singular value decomposition (SVD) of $R^T Q_P R$ may be computed as $R^T Q_P R = U\Sigma^2 U^T$.

Sixth, the transformation matrix T may be computed as $T = R\hat{U}\hat{\Sigma}^{-1/2}$, where $\hat{U}\hat{\Sigma}$ are parts of $U,\Sigma$ according to a target model order.

Seventh, one may apply the transformation $$\hat{A}_P = T^{-1} A_P T = \begin{pmatrix} \hat{A}_{11} & \hat{A}_{12} \\ \hat{A}_{21} & \hat{A}_{22} \end{pmatrix}, \hat{B}_P = T^{-1} A_P T = \begin{pmatrix} \hat{B}_1 \\ \hat{B}_2 \end{pmatrix},$$

-continued $\hat{C}_P = CT = [\hat{C}_1 \; \hat{C}_2], \hat{D} = D.$

From the applying the transformation, one may get a reduced state space model $\overline{A}_P, \overline{B}_P, \overline{C}_P, \overline{D}_P$ of parallel units as (a truncation)

$\overline{A}_P \hat{A}_{11}, \overline{B}_P = \hat{B}_1,$ $\overline{C}_P = \hat{C}_1, \overline{D}_P = \hat{D},$ or as (a singular perturbation)

$\overline{A}_P = \hat{A}_{11} - \hat{A}_{12}\hat{A}_{22}^{-1}\hat{a}_{21}, \overline{B}_P = \hat{B}_1 - \hat{A}_{12}\hat{A}_{22}^{-1}\hat{B}_2,$ $\overline{C}_P = \hat{C}_1 - \hat{C}_2\hat{A}_{22}^{-1}\hat{A}_{21}, \overline{D}_P = \hat{D}_P = \hat{D} - \hat{C}_2\hat{A}_{22}^{-1}\hat{B}_2.$ Eighth, the reduced model of parallel units may be combined with the model of the remaining system to get a final reduced model for the APC as $A = \begin{bmatrix} A_P + B_{PY}L\overline{D}_M C_{P2} & B_{PY}L\overline{C}_M \\ \overline{B}_M M C_{P2} & \overline{A}_M + \overline{B}_M M D_{PY2}\overline{C}_M \end{bmatrix},$ $B = \begin{bmatrix} B_{PW} + B_{PY}L\overline{D}_M D_{PW2} \\ \overline{B}_M M D_{PW2} \end{bmatrix},$ $C = [C_{P1} + D_{PY1}\overline{D}_M M C_{P2} \quad D_{PY1}L\overline{C}_M],$ $D = D_{PW1} + D_{PY1}\overline{D}_M M D_{PW2},$ $L := I - \overline{D}_M D_{PY2}^{-1}, M := I - D_{PY2}\overline{D}_M^{-1}.$ An algorithm for structured model reduction may be similar to the Sandberg algorithm of a structured balanced reduction as indicated in Henrik Sandberg, Richard M. Murray, "Model reduction of interconnected linear systems", Optimal Control, Applications and Methods, Special Issue on Directions, Applications, and Methods in Robust Control, 30:3, pp. 225-245, May/June 2009 (Sandberg algorithm). The present approach may be essentially an application of structured model reduction algorithm to an issue of modeling parallel working units under closed-loop for advanced process control (APC). The present approach solution may eliminate the need to do an identification experiment for all configurations of parallel units and require a need to do the same number of identification experiments as the number of parallel units.

FIG. 2a is a diagram of a controller 72 for processing the workflow of the items in the diagram of FIG. 2 for an example system shown in FIG. 1. Controller 72 may process inputs 71 as needed for the workflow in the model identification phase 41 and the model combination phase 42 to provide a reduced order model at an output 73 for an advanced process control. The reduced order model may go from output 73 to a controller 74 which may effect the advanced process control.

Figure 3:
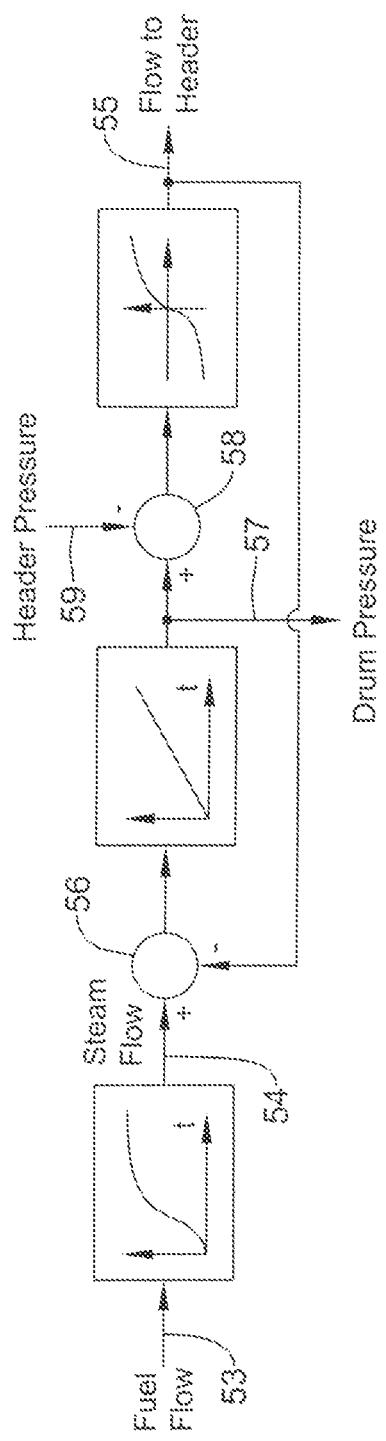
FIG. 3 is a diagram of a boiler block scheme.

An industrial example may be a set of boilers feeding a common header. Typically, fuel flow of all of the boilers may be operated by a common signal. Each boiler may, with significant simplification, be described by internal boiler volume and hydrodynamic pipe resistance between the boiler and a common header. FIG. 3 is a diagram of a boiler block scheme. There may also be dynamics from fuel flow 53 to generated steam 54, which can be "normalized" by a local combustion controller (to avoid oscillations/pushing among the parallel units). An output 55 of flow to a header may provide negative feedback at a junction 56. Resulting drum pressure 57 may be fed to a junction 58 along with a negative addition of header pressure 59. The result may be the flow 55 to the header.

Low order models may be obtained by performing experiments for virtually all possible on/off combinations, and then fitting a reduced order model, or by using certain heuristics for parallel models reduction. Performing experiments for all combinations is not necessarily practical as the number of combinations may typically exceed tens/hundreds for larger solutions.

Model reduction in the related art may be done by the following heuristic (based on first principles). The parallel boilers may be replaced by a single boiler with normalized fuel flow to steam flow dynamics. Drum volume may be computed as a sum of individual boiler drum volumes. Then, pipe resistance may be computed as a parallel resistance of individual boiler pipe resistances.

Although this described heuristic may appear to work quite well for boilers; it may be preferable to replace the heuristic by a systematical approach, such as a balanced order reduction. A straightforward naive application of balanced reduction to parallel models and integration of a reduced model to global model, may give a significantly biased and even an unstable global model. An issue is that the "local" reduction of parallel models should be done with respect to a global model.

Figure 4:
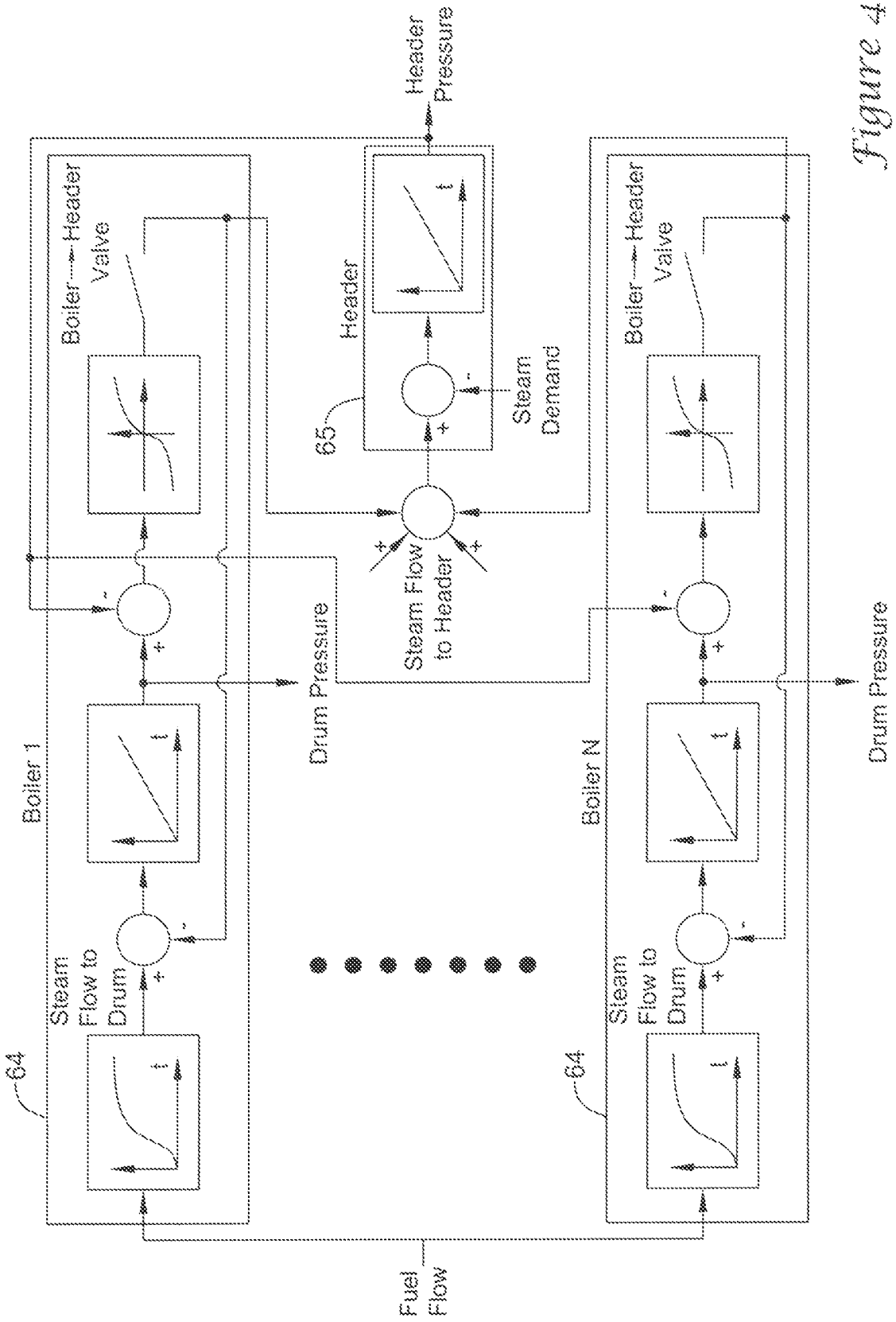
FIG. 4 is a diagram of an N number of boilers feeding a single header.

An arrangement of parallel boilers may be noted as an example. The following simulations may assume boilers feeding steam to a single header. FIG. 4 is a diagram which shows an N number of boilers connected to a header and indicates components of boiler flow. It may be seen that a naive balanced reduction may have a large bias and tend to be unstable. The structure-preserving algorithm may give consistent results with minimized degradation to a full order model.

A linearized boiler model may be simulated as:

$A_i = \begin{pmatrix} -1/T_i & 0 \\ 1/V_i & -K_i/V_i \end{pmatrix}, B_i = \begin{pmatrix} K_s/T_i & 0 \\ 0 & K_i/V_i \end{pmatrix},$ $u = \begin{pmatrix} p \\ FF \end{pmatrix}$ ... header pressure
... fuel flow $C_i = 0 \; K_i, \; D_i = 0 \; -K_i, \; y = SF$ ... steam flow to header where
$V_i$ ... i-th boiler volume
$K_i$ ... i-th boiler pipe to header conductivity
$K_S$ ... units of steam from unit fuel
$T_i$ ... i-th boiler 1$^{st}$ order time constant for fuel flow->steam flow
A linearized header model may be simulated as:

$A_h = 0, \; B_h = 1/V_H \; -1/V_H, \; u = \begin{pmatrix} SF \\ SD \end{pmatrix}$ ... steam flow to header
... steam demand $C_h = 1, D_h = 0 \; 0, \quad y = p$ ... header pressure where
$V_H$ ... header volume
The parameters may be chosen as:
$K_s=10$, $V=300 \; 500 \; 700$, $K=100 \; 130 \; 150$, $V_H=100$.
The global model may have inputs Fuel Flow (FF) and Steam Demand (SD) and outputs Drum pressure (p) and overall Steam Flow to header (SF).

FIGS. 5a-5d are diagrams of model step responses (FF—fuel flow, SD—steam demand). Reduction with truncation (reduction to $3^{rd}$ order) may be noted. FIGS. 6a-6d are diagrams of reduced models step responses. FIGS. 7a-7d are diagrams of step responses differences to original system. Reduction with singular perturbations may be noted. FIGS. 8a-8d are diagrams of reduced models step responses. FIGS. 9a-9d are diagrams of step responses differences to original system.

Figure 5A:
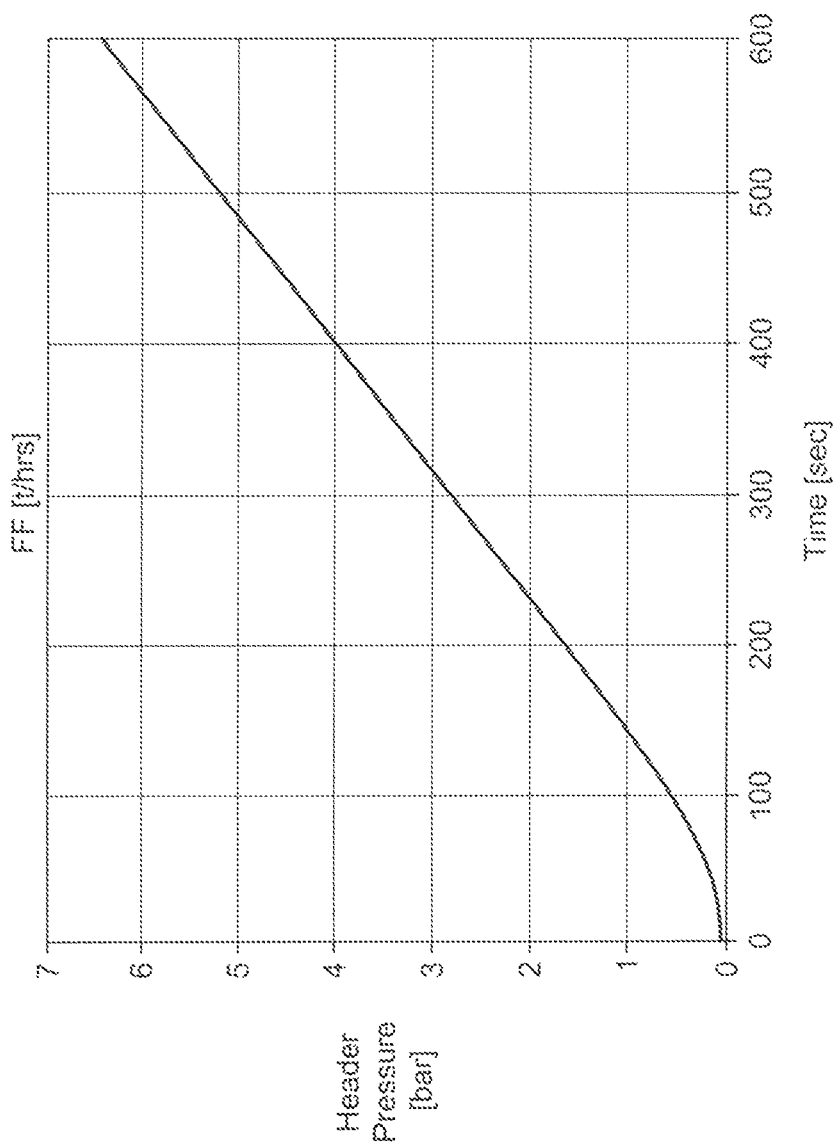
FIGS. 5a, 5b, 5c and 5d are data graphs of header pressure versus time for fuel flow, of header pressure versus time for steam demand, of stream flow to header versus time for fuel flow, and of steam flow to header versus time for steam demand, respectively.
Figure 5B:
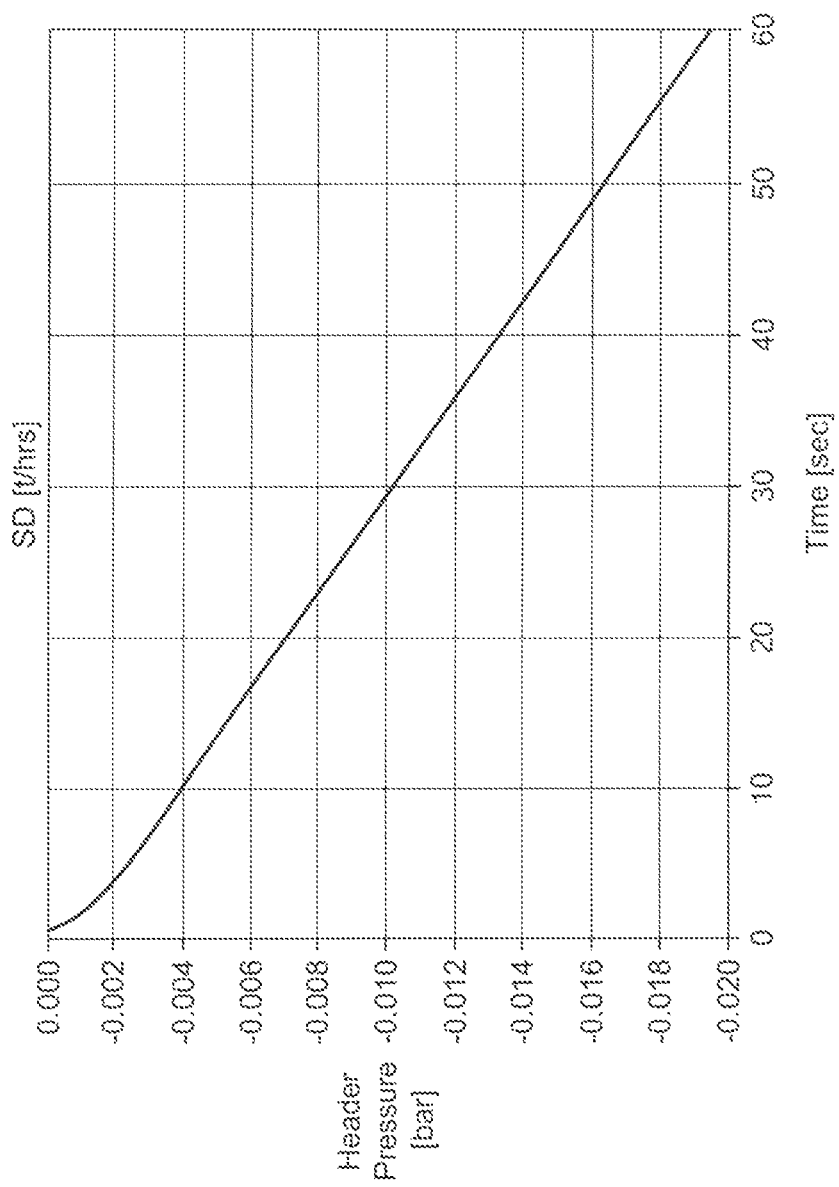
Figure 5C:
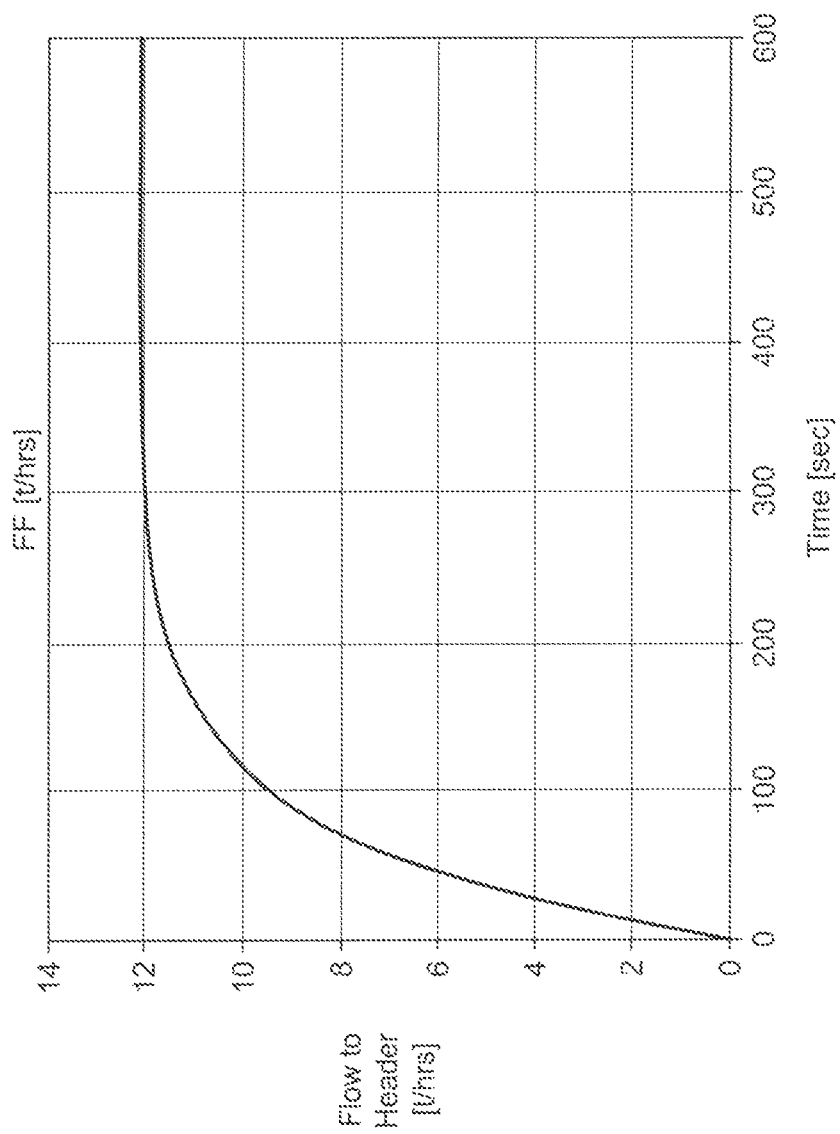
Figure 5D:
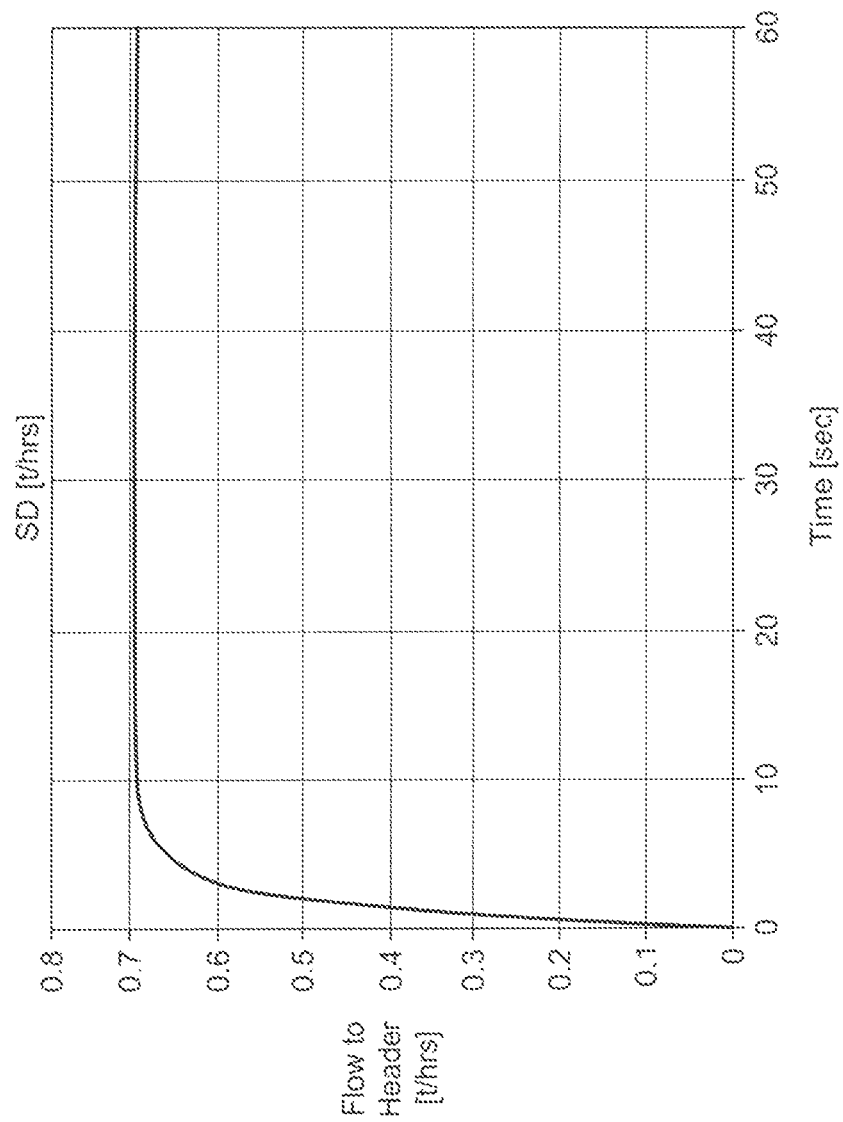

The global model may be of a 7th order with step responses in the graphs of FIGS. 5a-5b. The target model order may be selected as 3. FIG. 5a shows header pressure (bar) versus time (sec) for fuel flow (t/hrs). FIG. 5b shows header pressure (bar) versus time (sec) for steam demand (t/hrs). FIG. 5c shows stream flow to header (t/hrs) versus time (sec) for fuel flow (t/hrs). FIG. 5d shows steam flow to header (t/hrs) versus time for steam demand (t/hrs).

The results for truncation are shown in FIGS. 6a-6d and differences to full order model are shown in FIG. 7a-7d. Similar comparisons for singular perturbations are shown in FIGS. 8a-8d and 9a-9d.

Figure 6A:
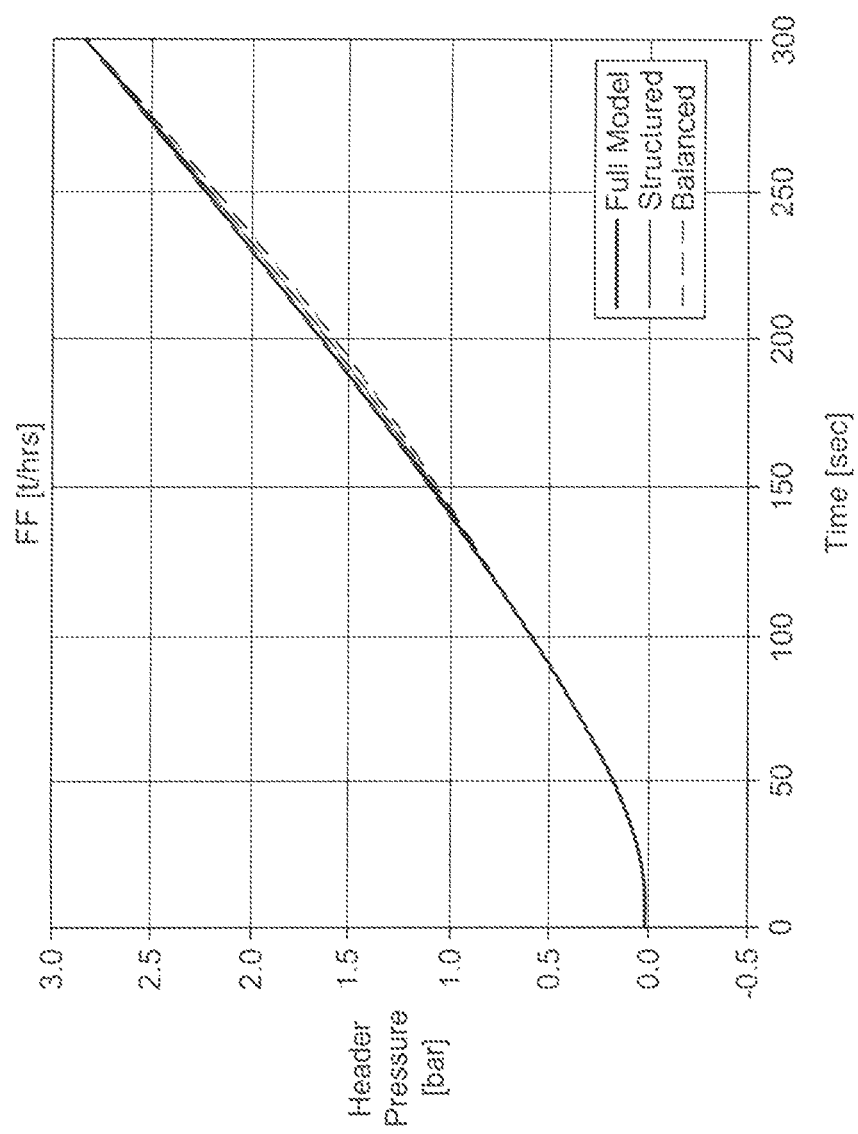
FIGS. 6a, 6b, 6c and 6d are data graphs of header pressure versus time for fuel flow, of header pressure versus time for steam demand, of flow to header versus time for fuel flow, and of flow to header versus time for steam demand, respectively.
Figure 6B:
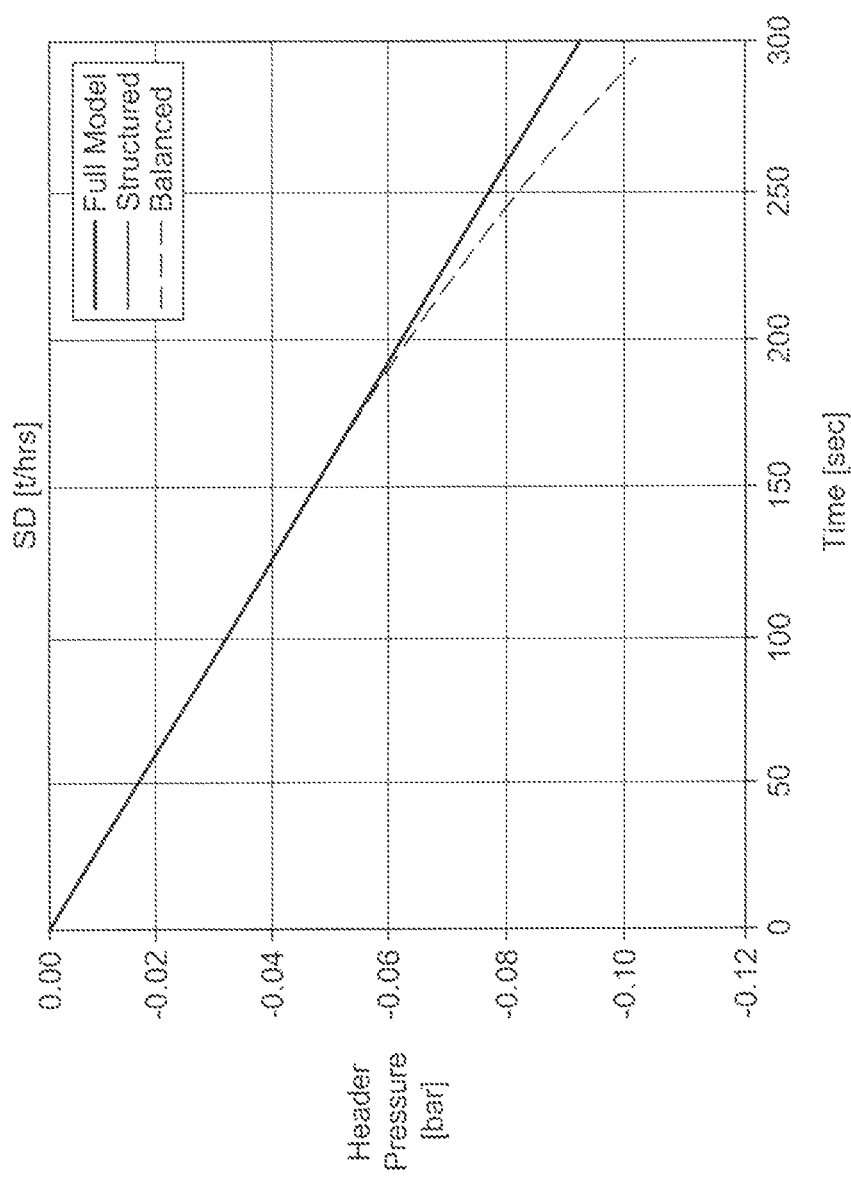
Figure 6C:
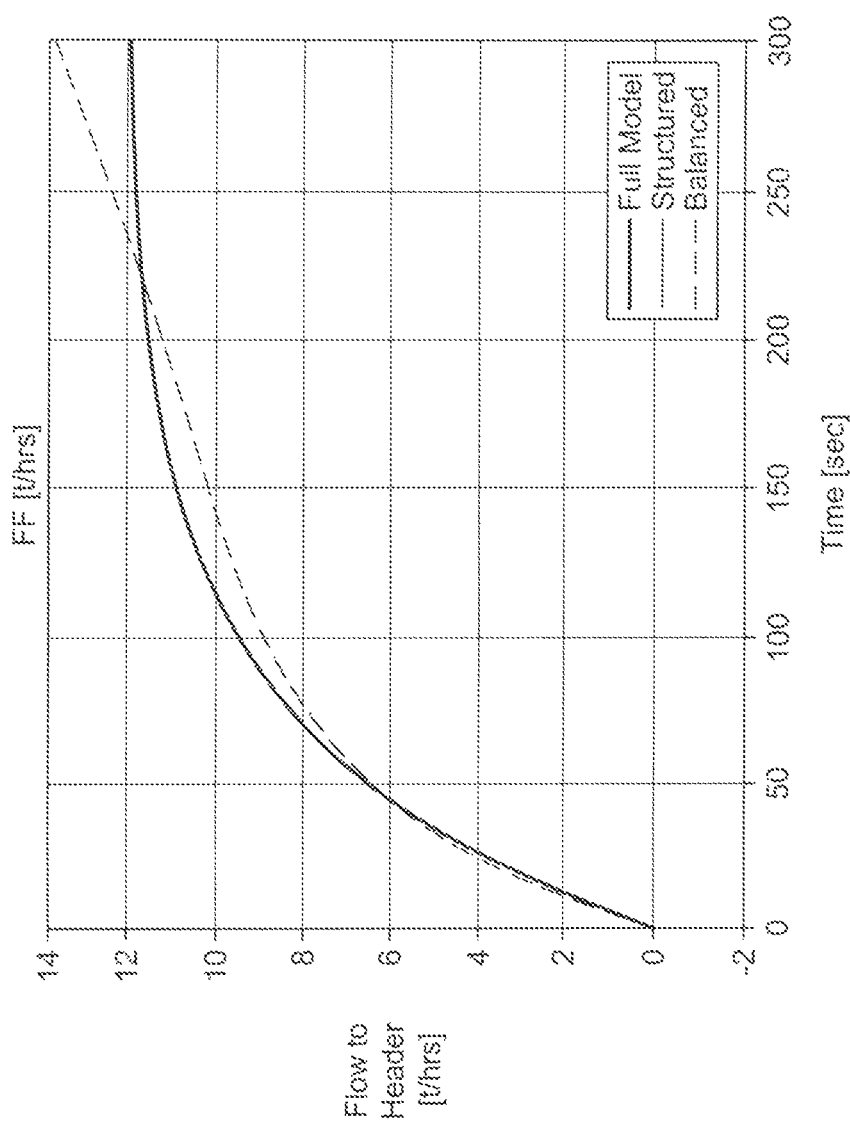
Figure 6D:
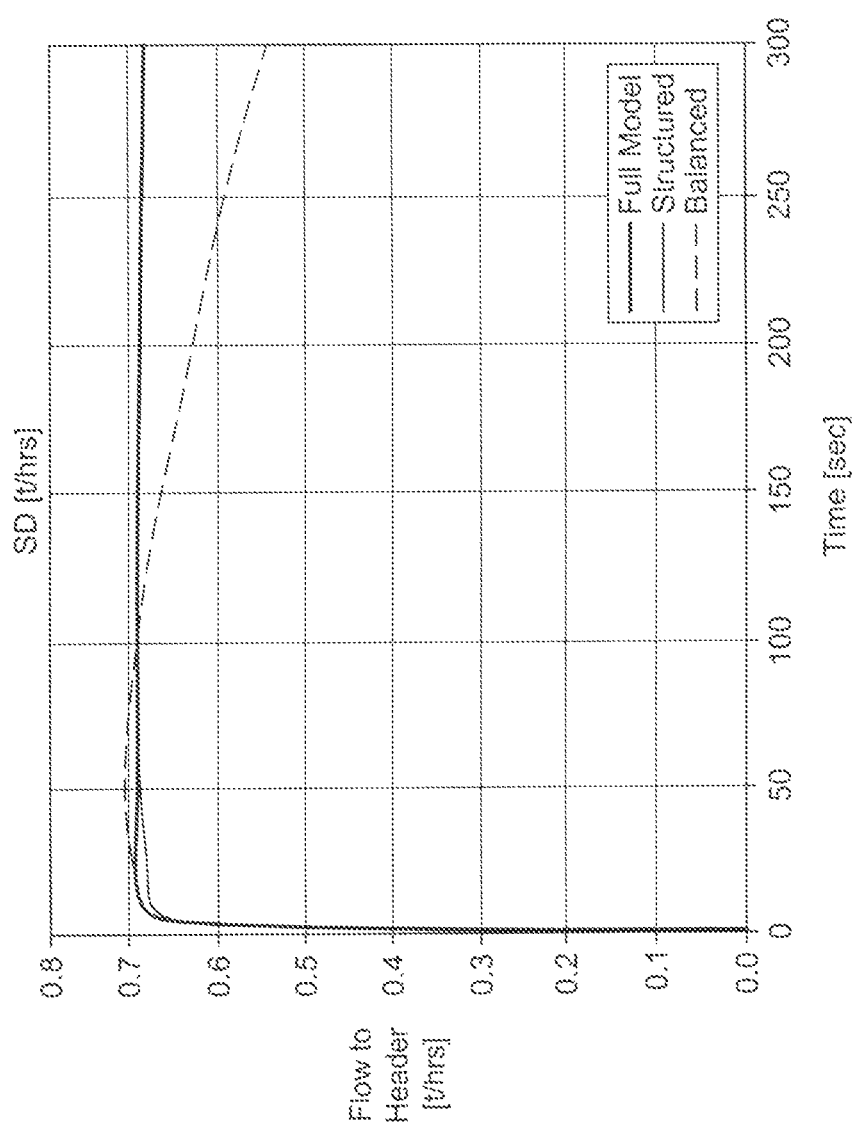
Figure 6E:
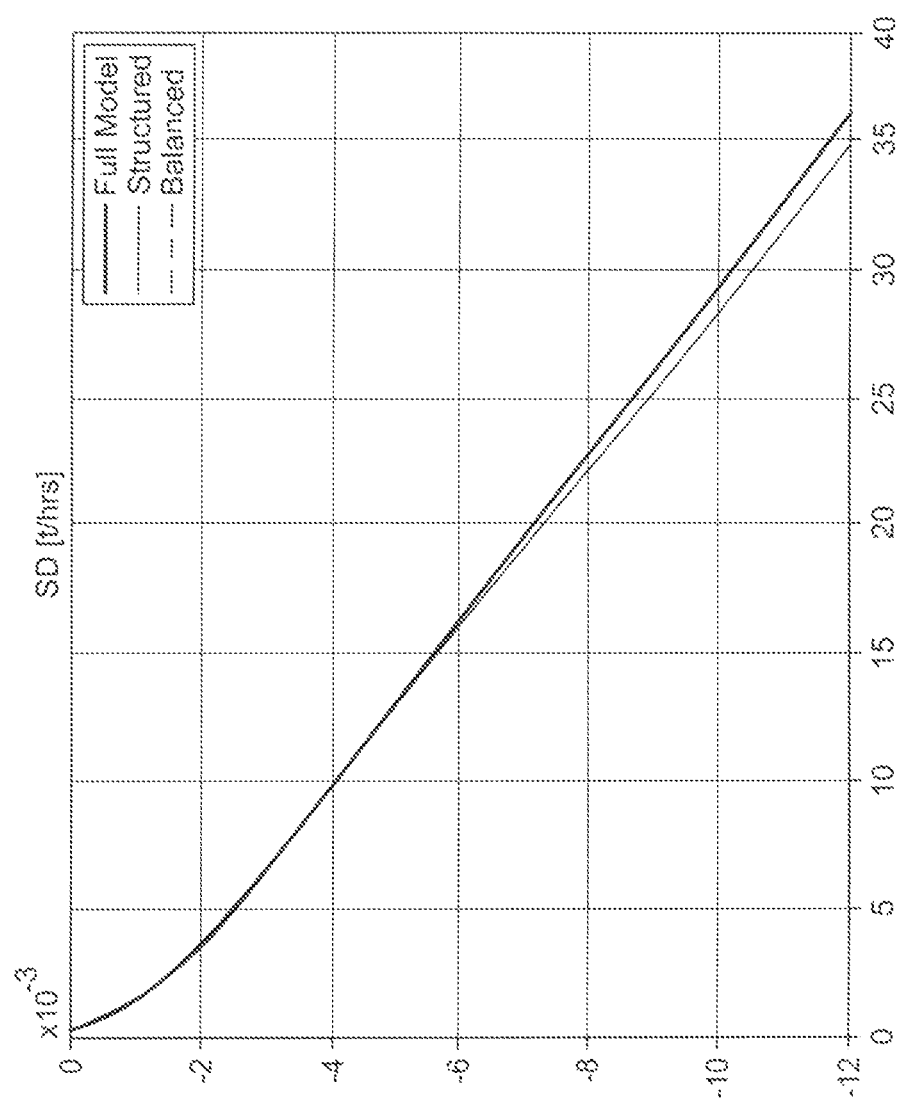
FIG. 6e is a graph of scale for steam demand in full model, structured and balanced versions.

FIG. 6a shows a graph of header pressure (bar) versus time (sec) for fuel flow (t/hrs), in full model, structured and balanced versions. FIG. 6b shows a graph of header pressure (bar) versus time (sec) for steam demand (t/hrs), in full model, structured and balanced versions. FIG. 6c show a graph of flow to header (t/hrs) versus time (sec) for fuel flow (t/hrs), in full model, structured and balanced versions. FIG. 6d is a graph of flow to header (t/hrs) versus time (sec) for steam demand (t/hrs), in full model, structured and balanced versions. FIG. 6e is a graph of scale for steam demand (t/hrs), in full model, structured and balanced versions.

Figure 7A:
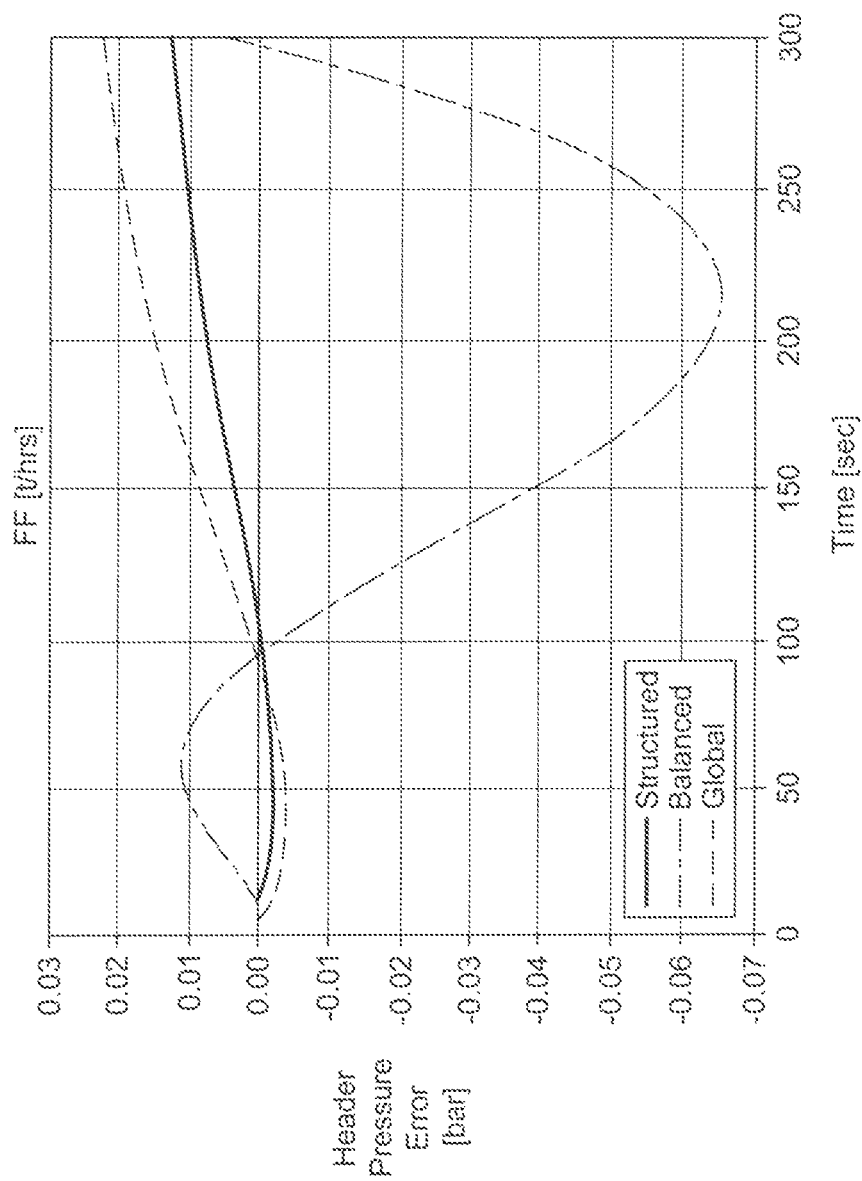
FIGS. 7a, 7b, 7c and 7d are data graphs of header pressure error versus time for fuel flow, of header pressure versus time for steam demand, of flow to header versus time for fuel flow, and of flow to header versus time for steam demand, respectively.
Figure 7B:
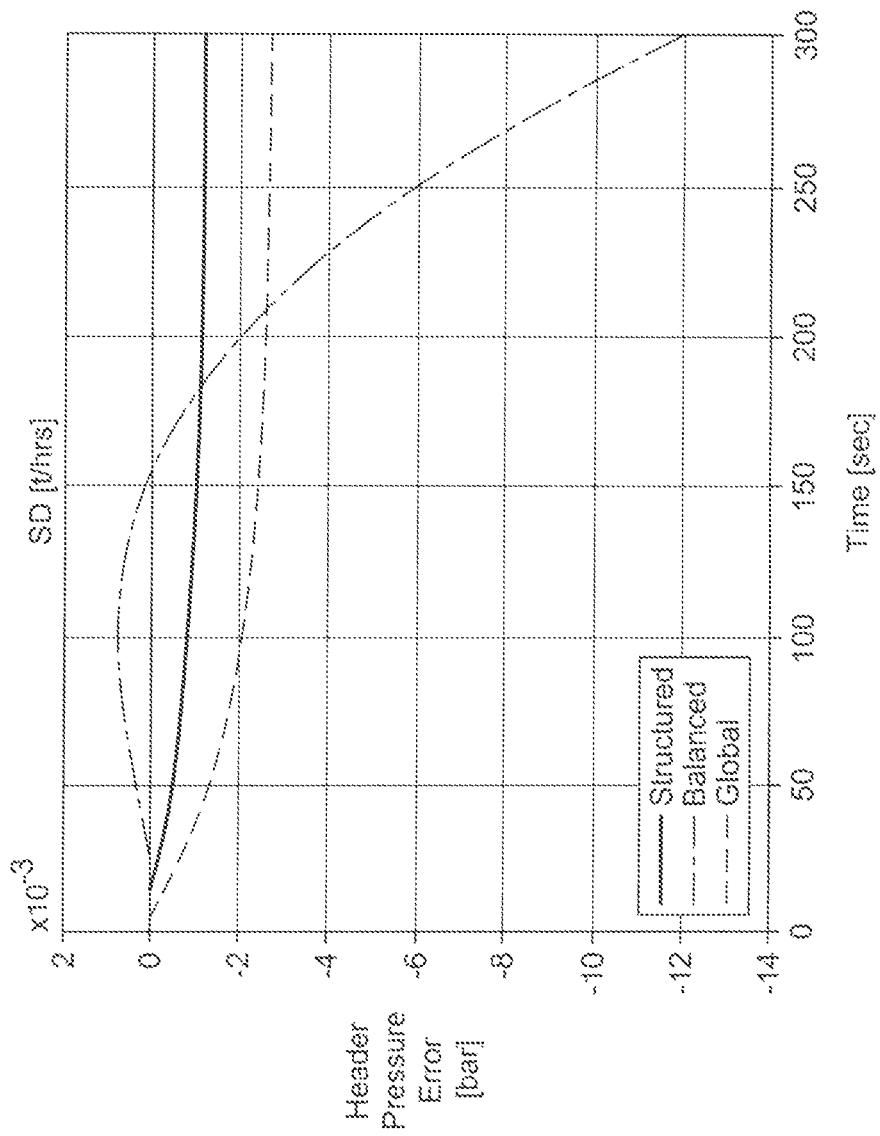
Figure 7C:
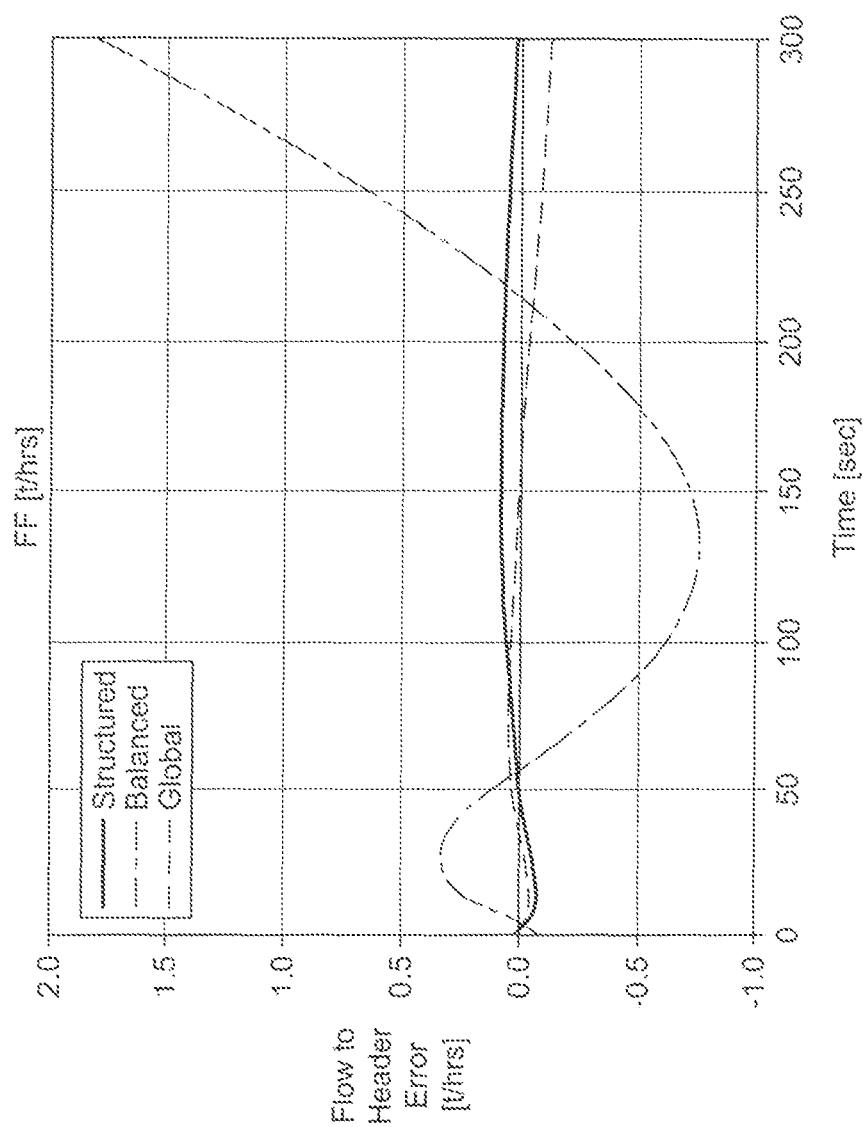
Figure 7D:
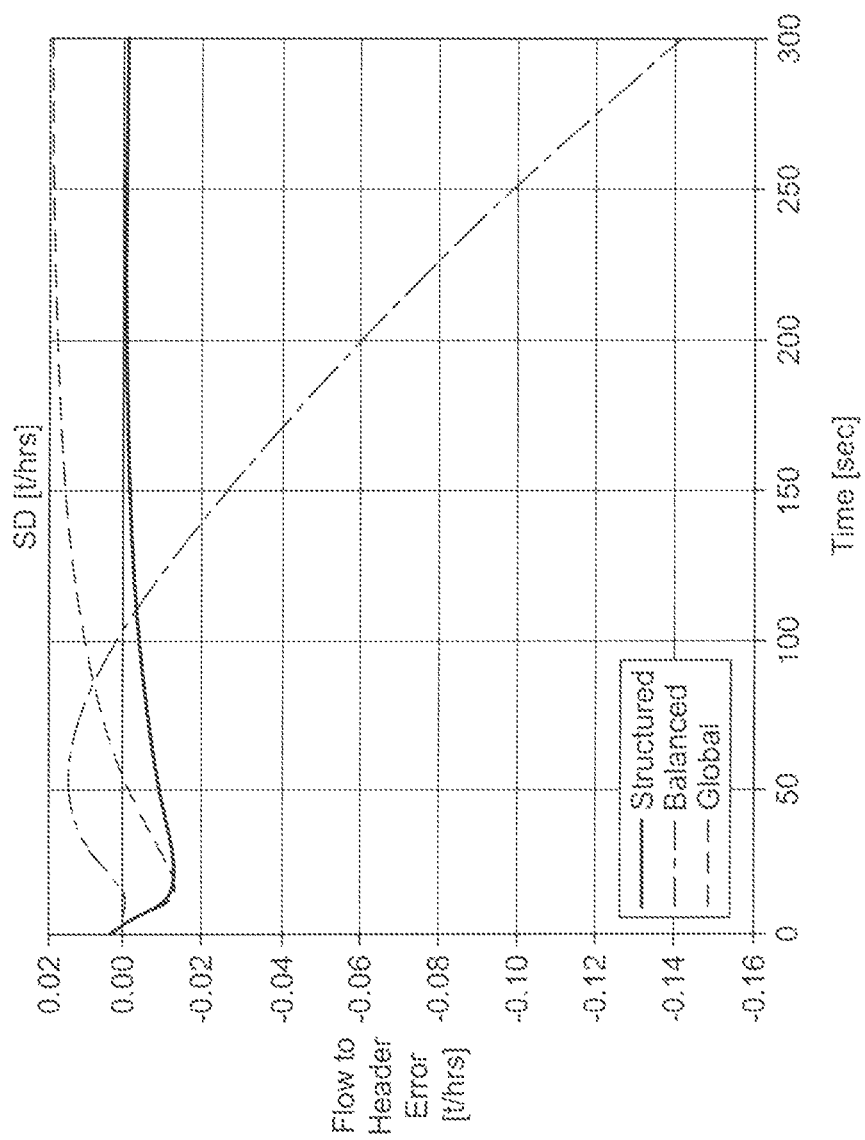

FIG. 7a is a graph of header pressure error (bar) versus time (sec) for fuel flow (t/hrs), in global (dark dashed line), structured (solid line) and balanced (light dashed line) versions. FIG. 7b is a graph of header pressure (bar) versus time (sec) for steam demand (t/hrs), in global (dark dashed line), structured (solid line) and balanced (light dashed line) versions. FIG. 7c is a graph of flow to header (t/hrs) versus time (sec) for fuel flow (t/hrs), in global (dark dashed line), structured (solid line) and balanced (light dashed line) versions. FIG. 7d is a graph of flow to header (t/hrs) versus time (sec) for steam demand (t/hrs), in global (dark dashed line), structured (solid line) and balanced (light dashed line) versions.

Figure 8A:
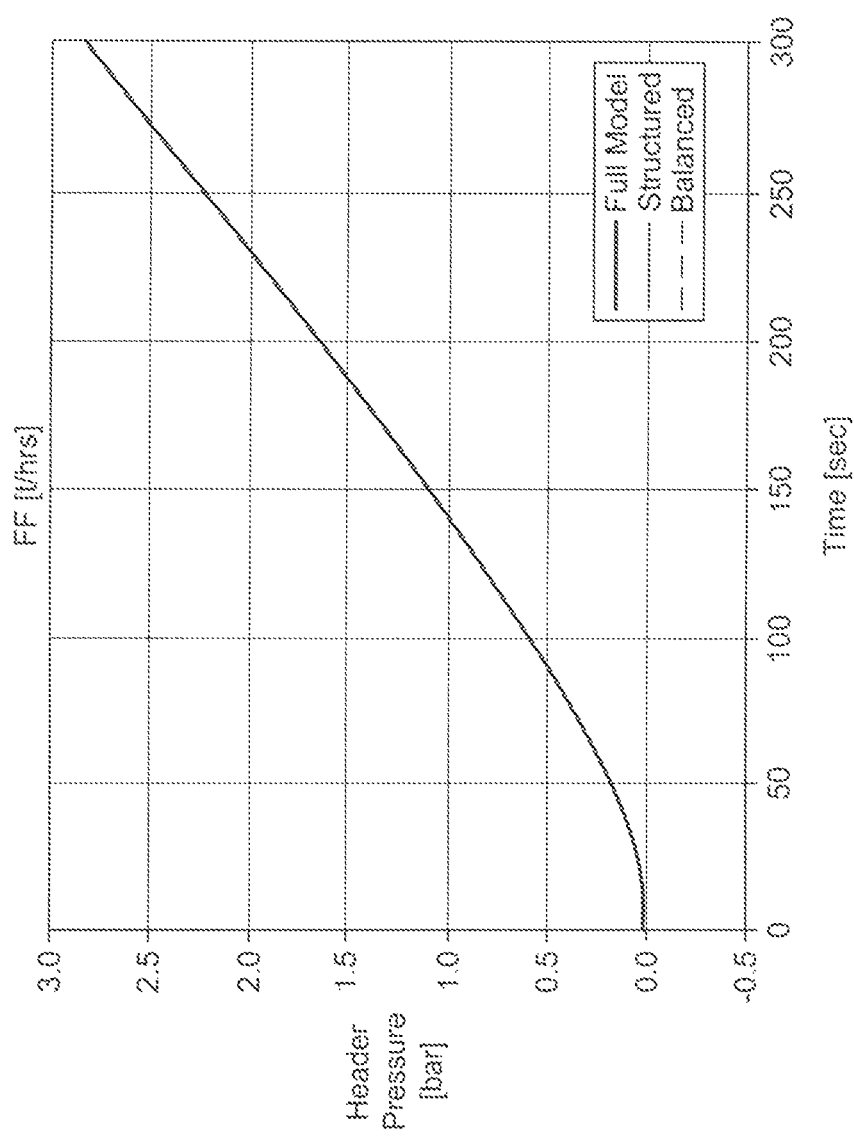
FIGS. 8a, 8b, 8c and 8d are data graphs of header pressure versus time for fuel flow, of header pressure versus time for steam demand, of flow to header versus time for fuel flow, and of flow to header versus time for steam demand, respectively.
Figure 8B:
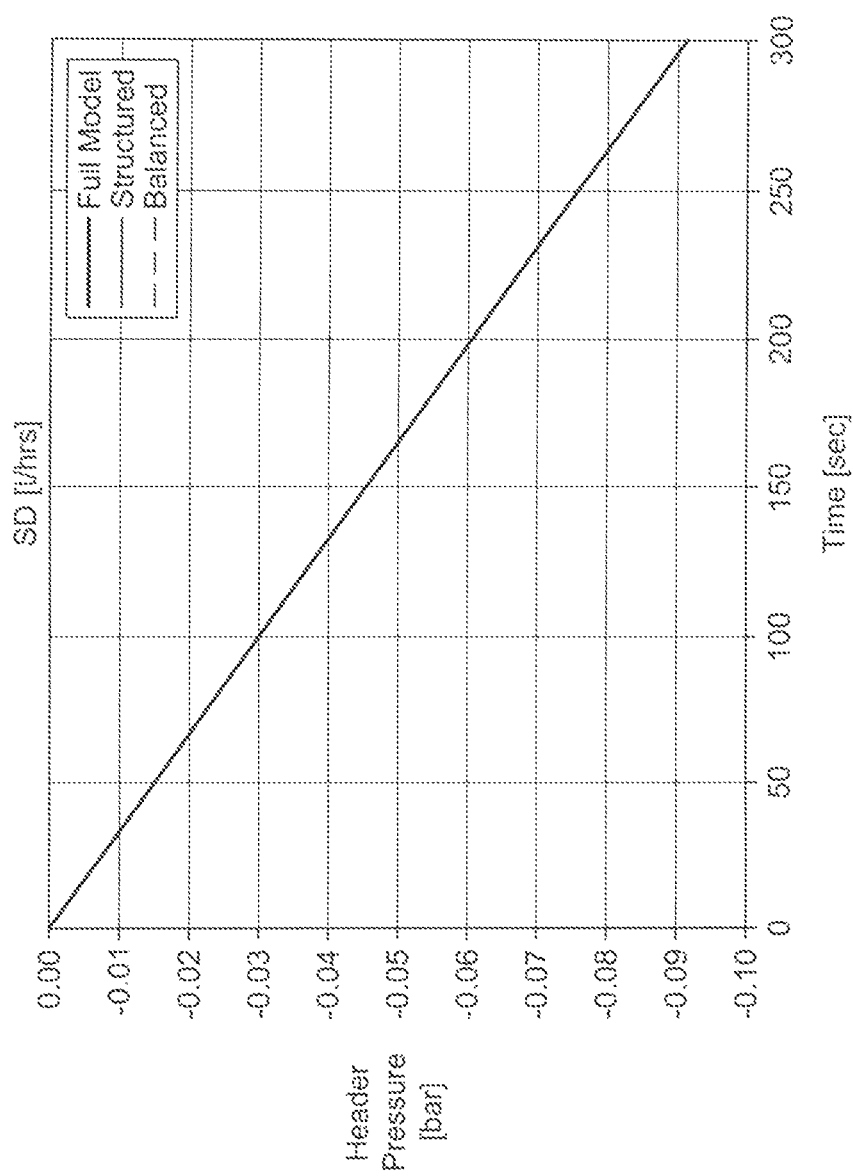
Figure 8C:
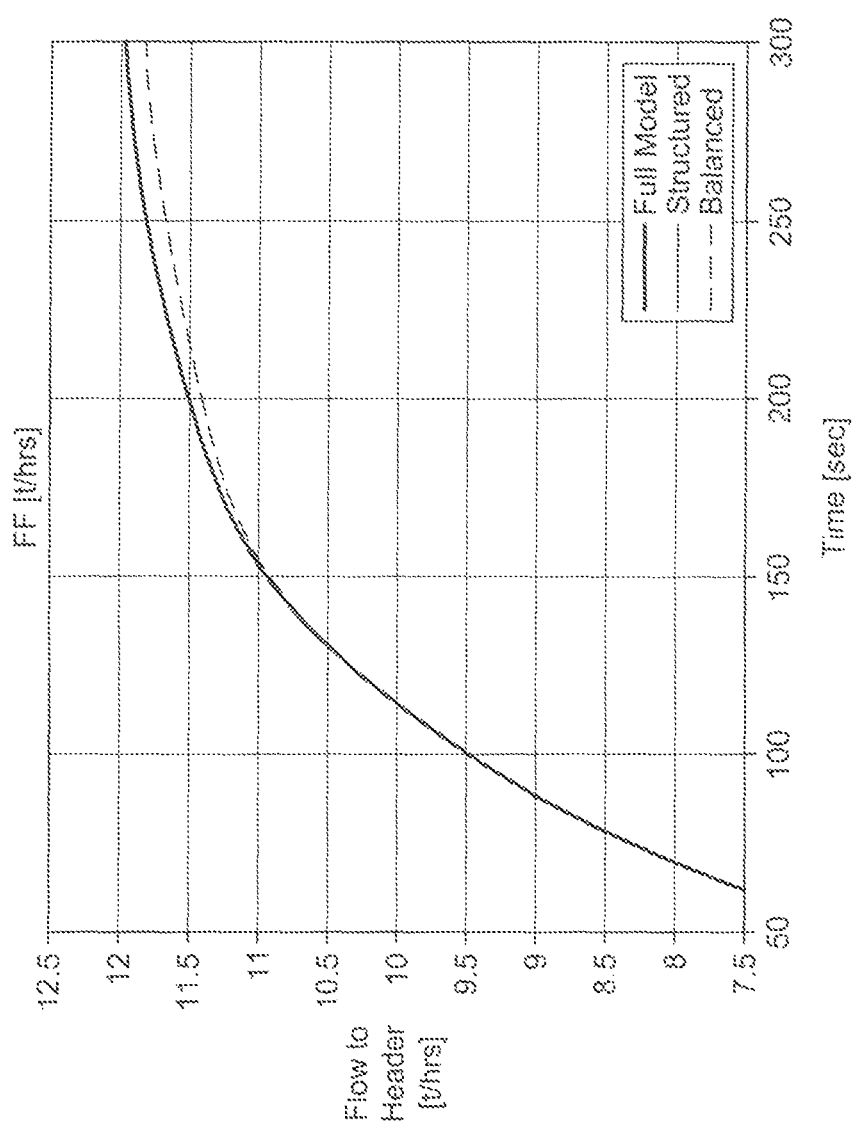
Figure 8D:
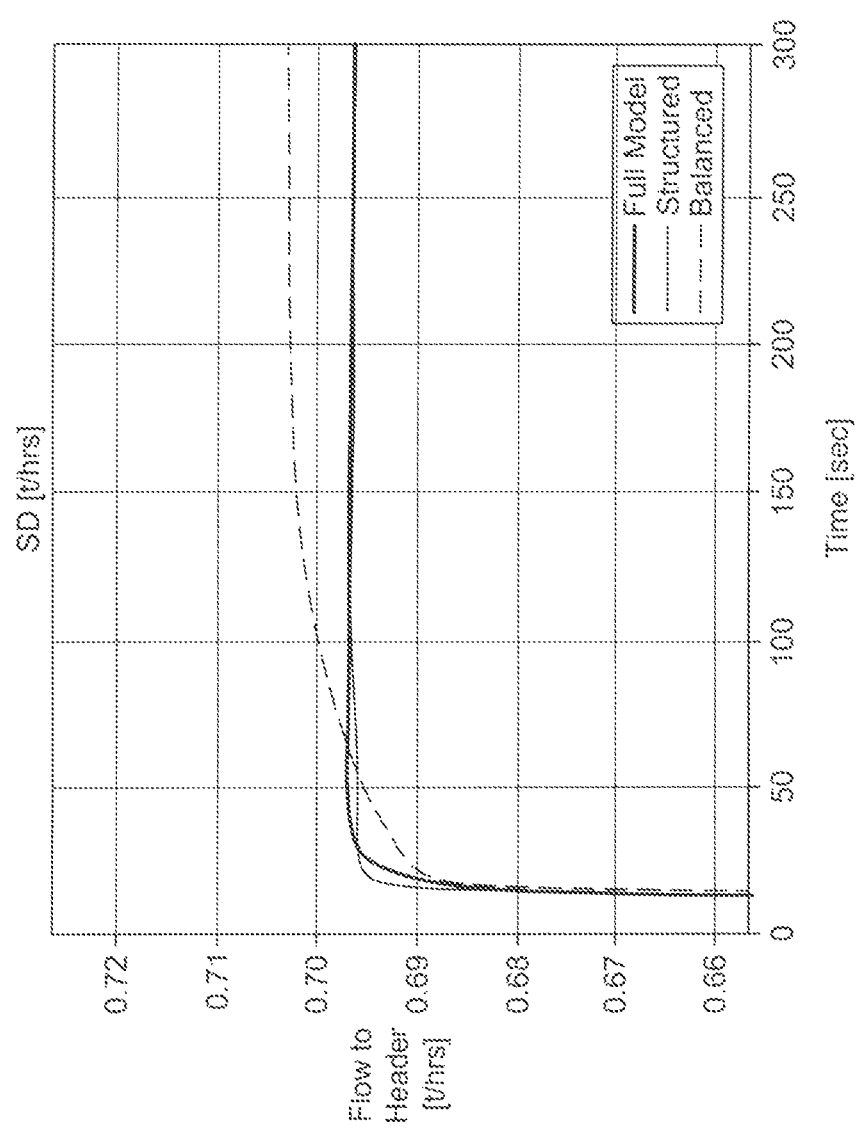

FIG. 8a is a graph of header pressure (bar) versus time (sec) for fuel flow (t/hrs), in full model (thick line), structured (thin line) and balanced (dashed line) versions. FIG. 8b is a graph of header pressure (bar) versus time (sec) for steam demand (t/hrs), in full model (thick line), structured (thin line) and balanced (dashed line) versions. FIG. 8c is a graph of flow to header (t/hrs) versus time (sec) for fuel flow (t/hrs), in full model (thick line), structured (thin line) and balanced (dashed line) versions. FIG. 8d is a graph of flow to header (t/hrs) versus time (sec) for steam demand (t/hrs), in full model (thick line), structured (thin line) and balanced (dashed line) versions.

Figure 9A:
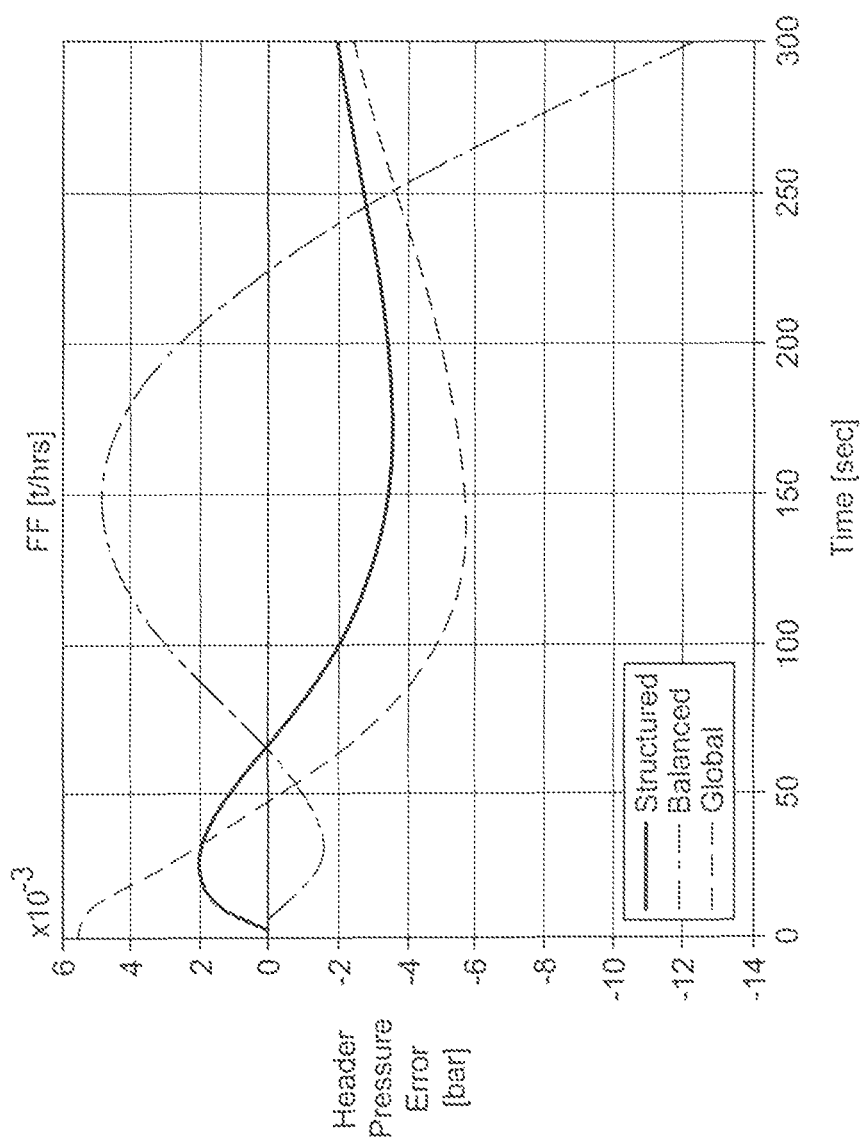
FIGS. 9a, 9b, 9c and 9d are data graphs of header pressure error versus time for fuel flow, of header pressure error versus time for steam demand, of flow to header error versus time for fuel flow, and of flow to header error versus time for steam demand.
Figure 9B:
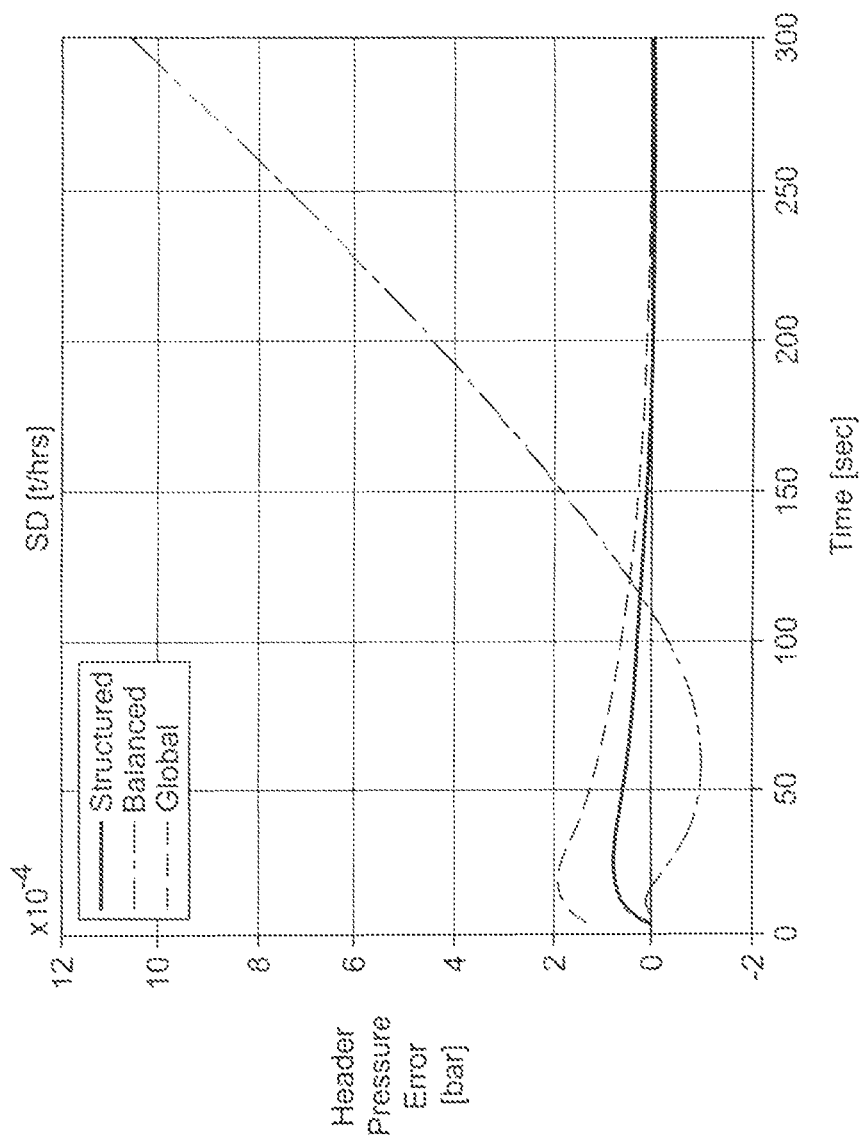
Figure 9C:
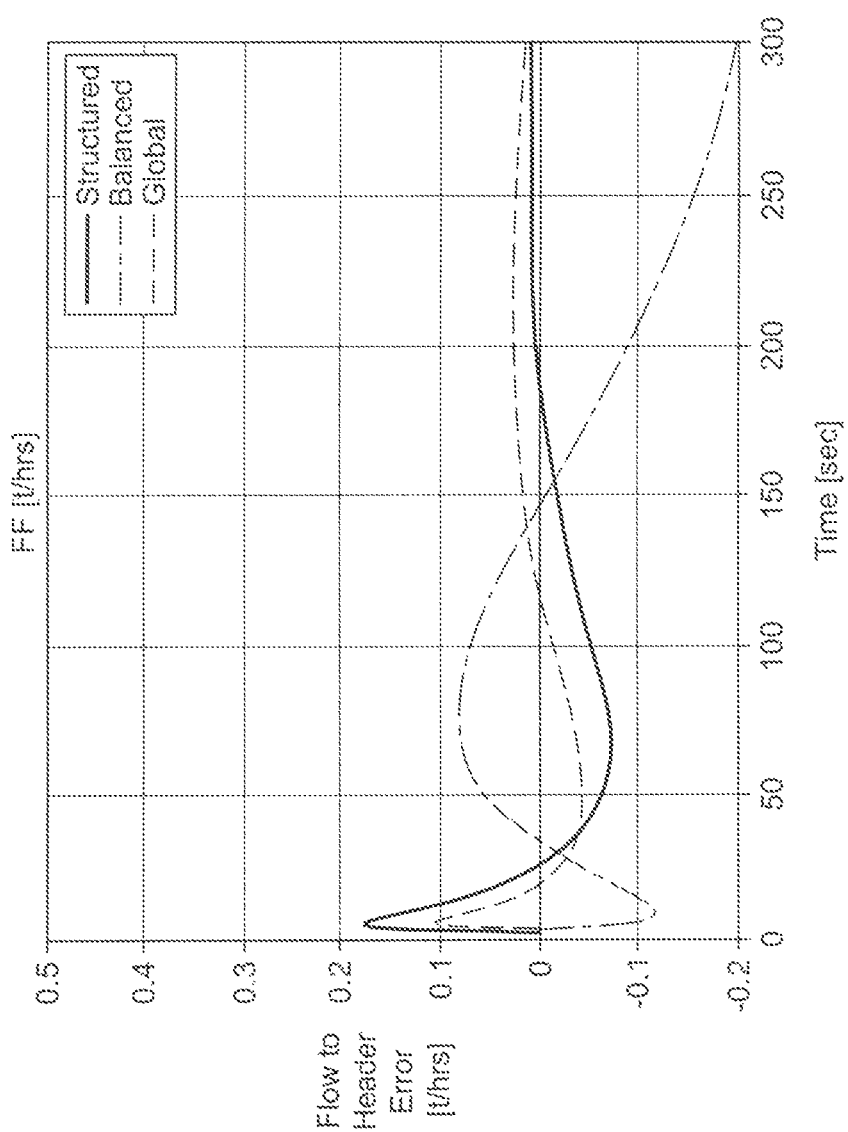
Figure 9D:
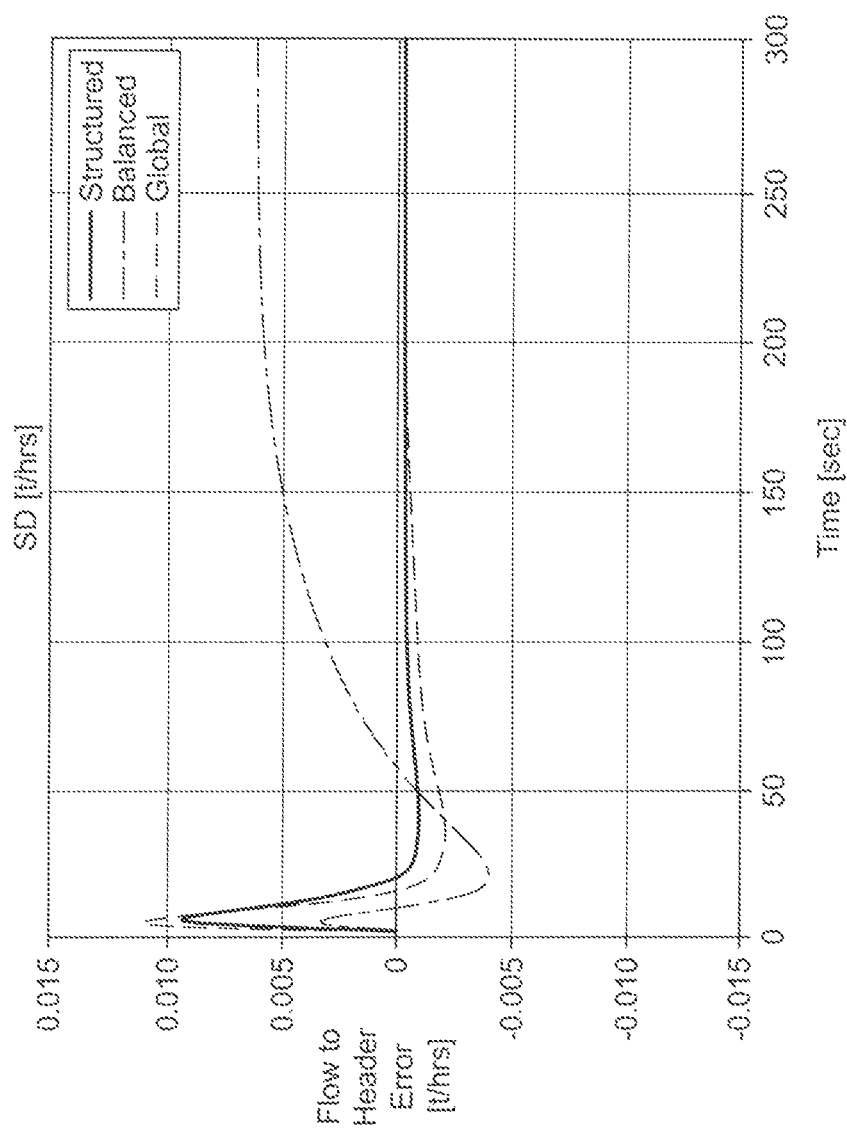

FIG. 9a is a graph of header pressure error (bar) versus time (sec) for fuel flow (t/hrs), in global (dark dashed line), structured (solid line) and balanced (light dashed line) versions. FIG. 9b is a graph of header pressure error (bar) versus time (sec) for steam demand (t/hrs), in global (dark dashed line), structured (solid line) and balanced (light dashed line) versions. FIG. 9c is a graph of flow to header error (t/hrs) versus time (sec) for fuel flow (t/hrs), in global (dark dashed line), structured (solid line) and balanced (light dashed line) versions. FIG. 9d is a graph of flow to header error (t/hrs) versus time (sec) for steam demand (t/hrs), in global (dark dashed line), structured (solid line) and balanced (light dashed line) versions.

Honeywell, spol. s r.o, V Parku 2326/18, Praha 4, 14800, Czech Republic, may have industrial boiler data for demonstrating algorithm efficiency.

FIGS. 5a-5d, 6a-6e, 7a-7d, 8a-8d, 9a-9d, 10a-10d, 11a-11d, 12a-12d and 13a-13d may be noted. The group of FIGS. 5a-5d, 6a-6e, 7a-7d, 8a-8d and 9a-9d, may appear similar to the group of FIGS. 10a-10d, 11a-11d, 12a-12d and 13a-13d; but are different in the sense that the group of FIGS. 5a-5d, 6a-6e, 7a-7d, 8a-8d and 9a-9d appear to show algorithm performance on artificial data and the group of FIGS. 10a-10d, 11a-11d, 12a-12d and 13a-13d appear to show results on data obtained from industrial measurements.

Figure 10A:
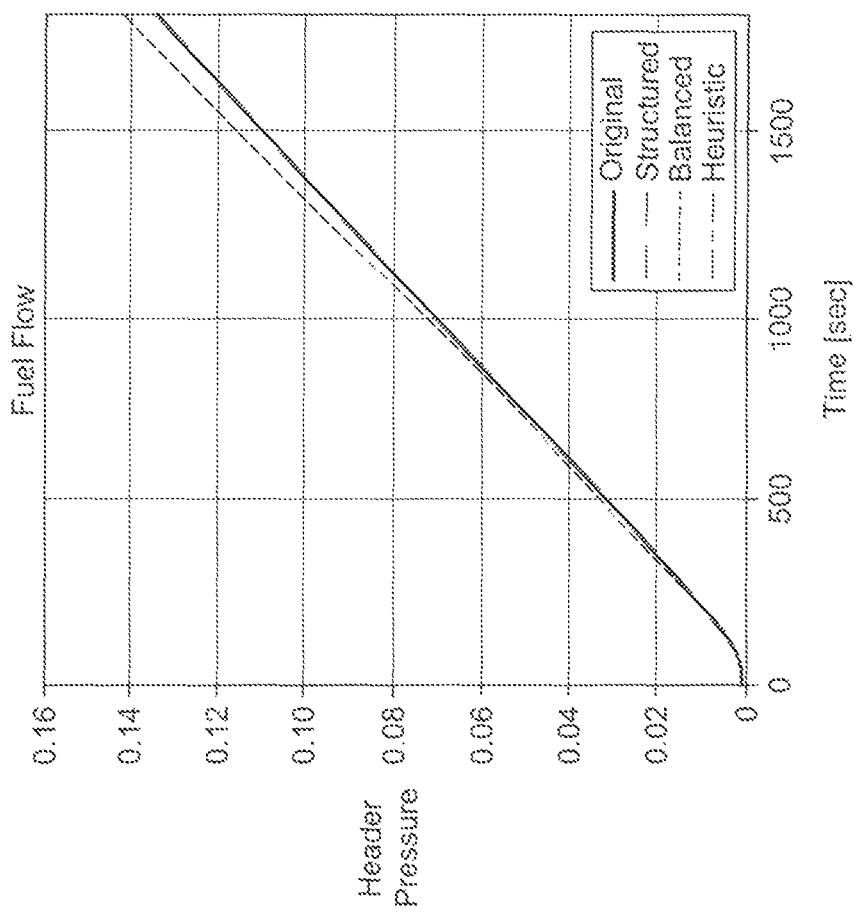
FIGS. 10a-10d and 11a-11d are data graphs of step responses and frequency responses, respectively, of structure vs. unstructured reduction, for the three boiler and single header system.
Figure 10B:
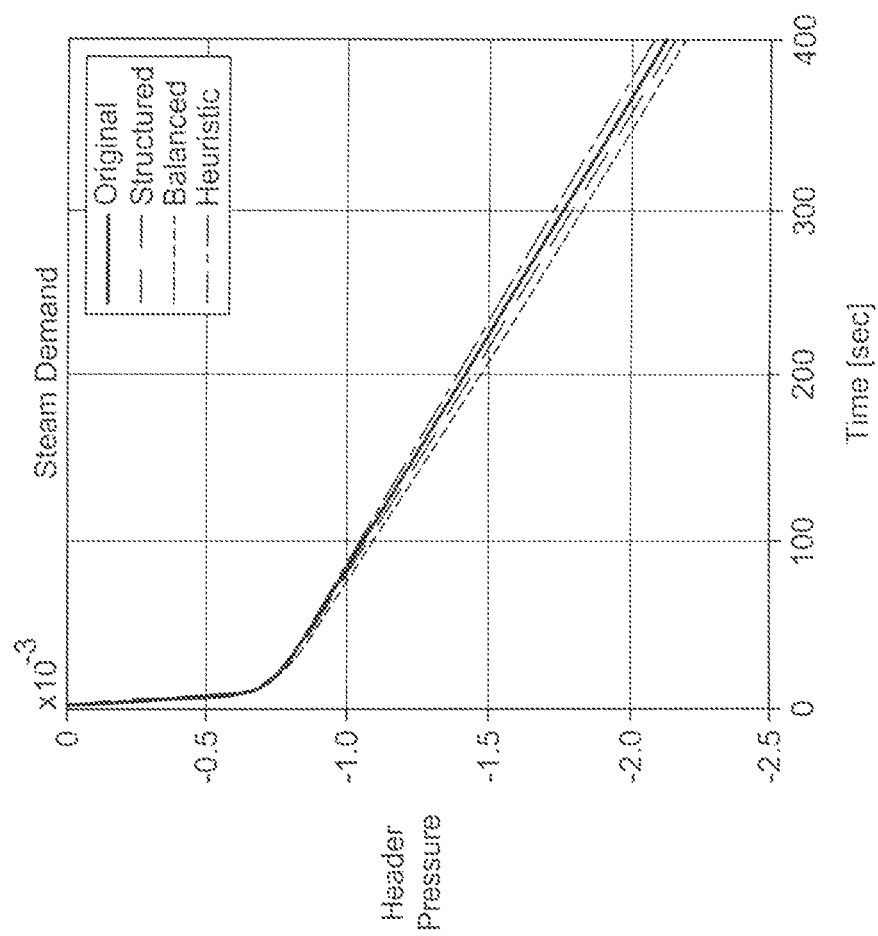
Figure 10C:
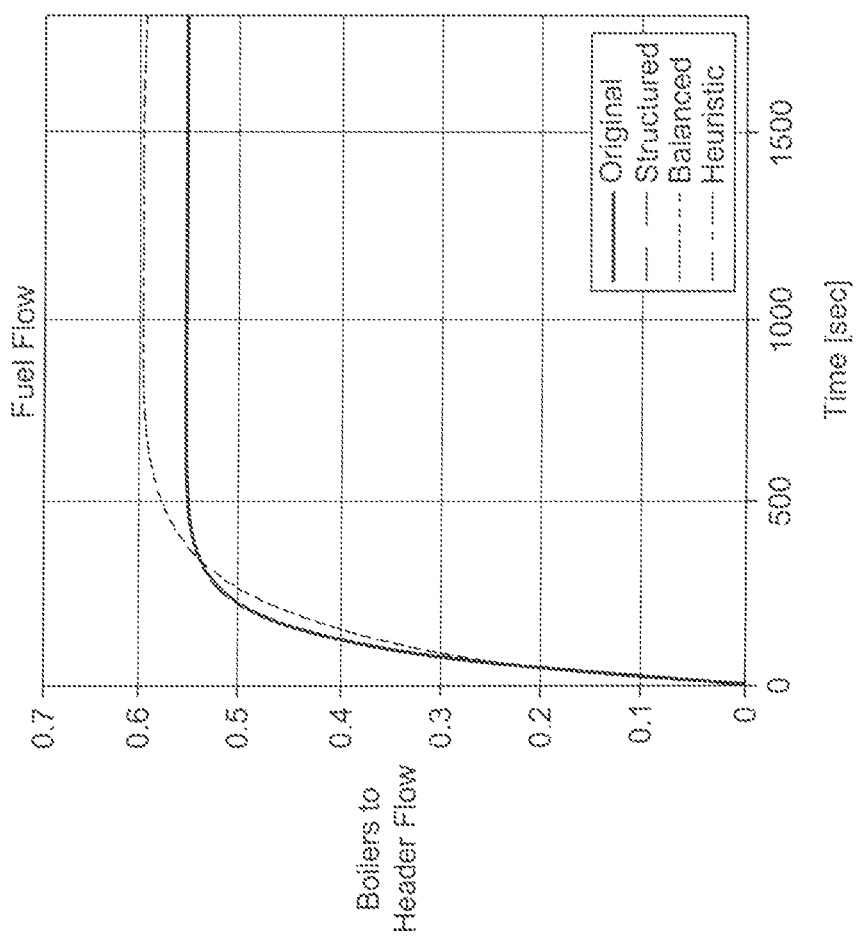
Figure 10D:
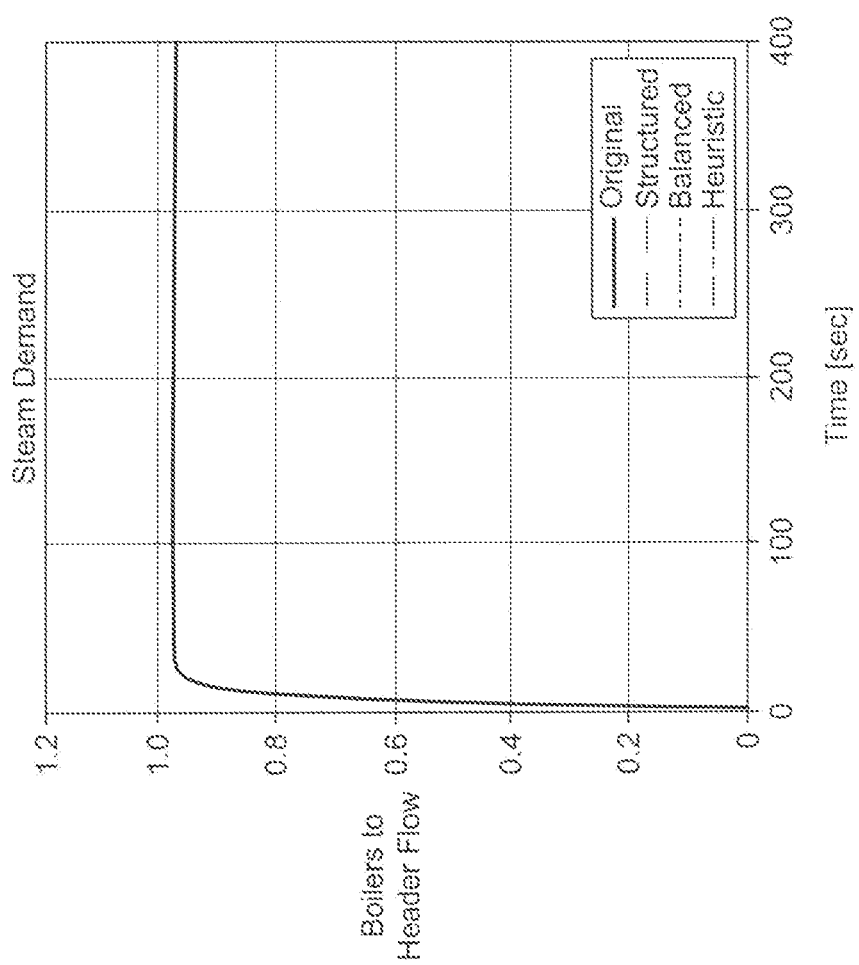
Figure 11A:
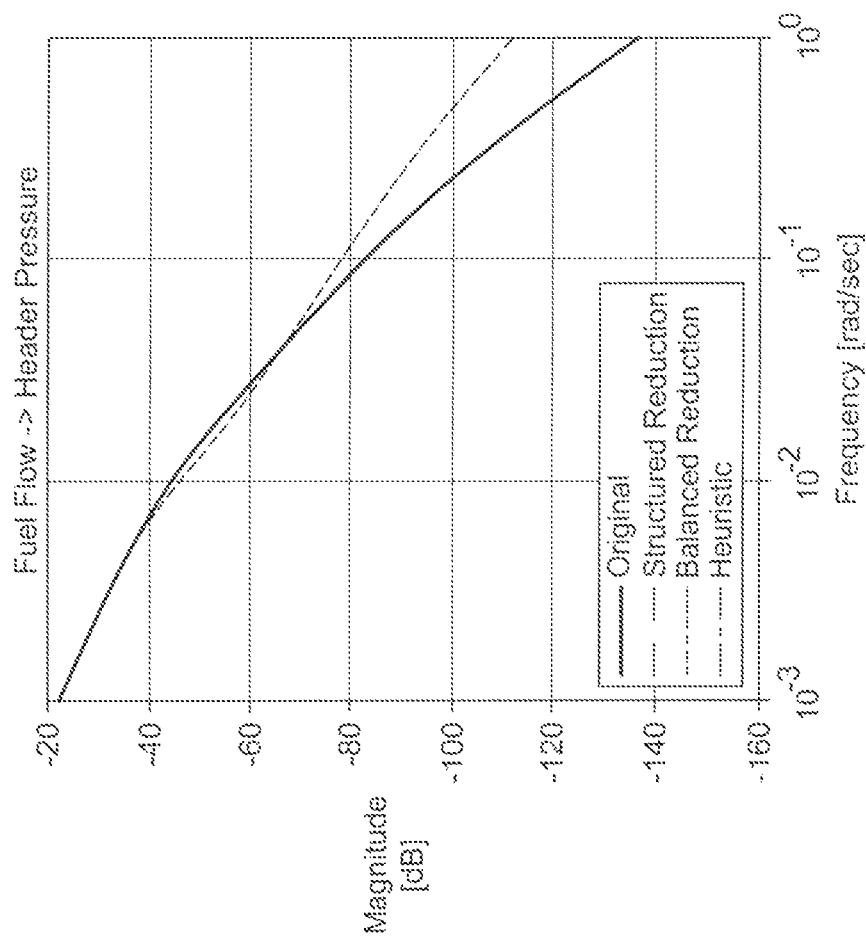
Figure 11B:
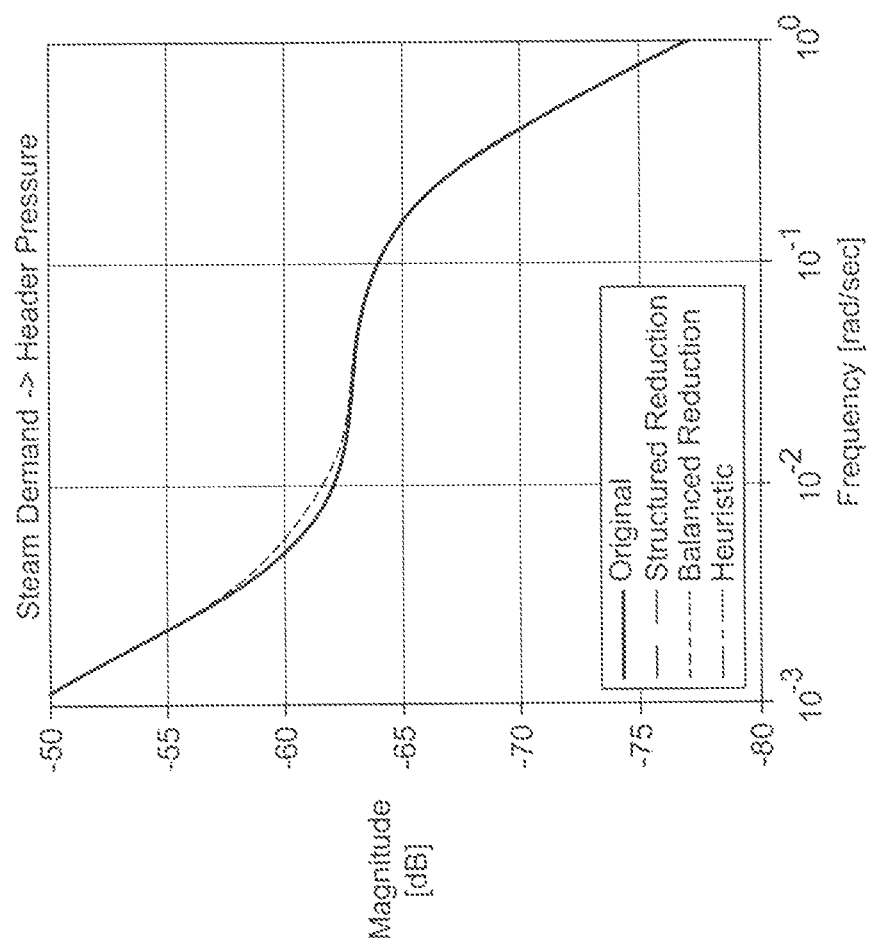
Figure 11C:
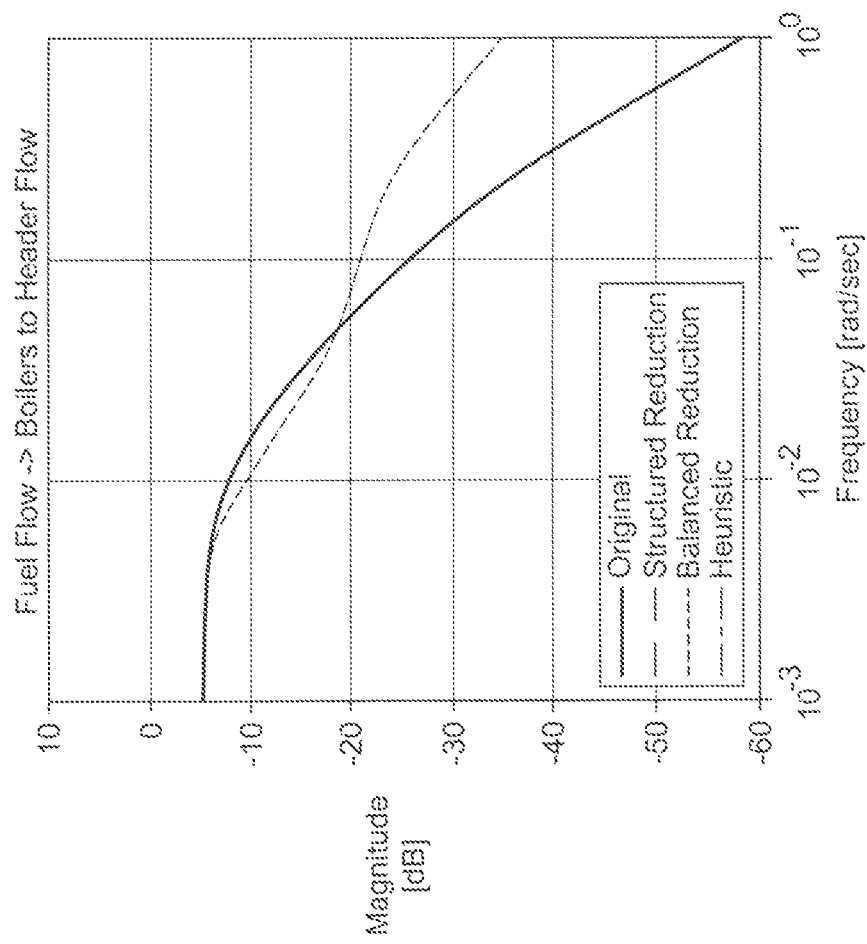
Figure 11D:
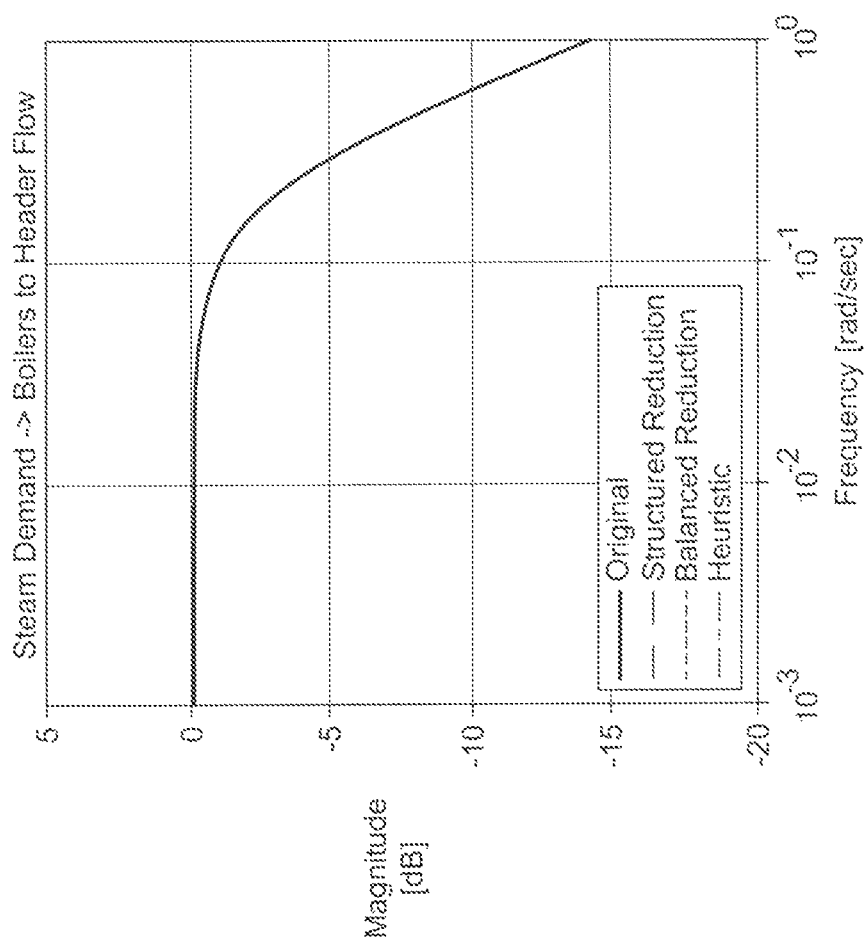

FIGS. 10a-10d and 11a-11d are graphs of data of step responses and frequency responses, respectively, of structure vs. unstructured reduction, for the example of three boilers and a single header. A solid line, a dashed line, a dotted line and a dash-dot line, represent original, structured, balanced and heuristic data plots, respectively. FIG. 10a shows header pressure versus time (sec) for fuel flow. FIG. 10b shows header pressure versus time (sec) for steam demand. FIG. 10c shows boilers to header flow versus time (sec) for fuel flow. FIG. 10d shows boilers to header flow versus time for steam demand. FIG. 11a shows magnitude (dB) versus frequency (rad/sec) for fuel flow→header pressure. FIG. 11b shows magnitude (dB) versus frequency (rad/sec) for steam demand→header pressure. FIG. 11c shows magnitude (dB) versus frequency (rad/sec) for fuel flow→boilers to header flow. FIG. 11d shows magnitude (dB) versus frequency (rad/sec) for steam demand→boilers to header flow.

Figure 12A:
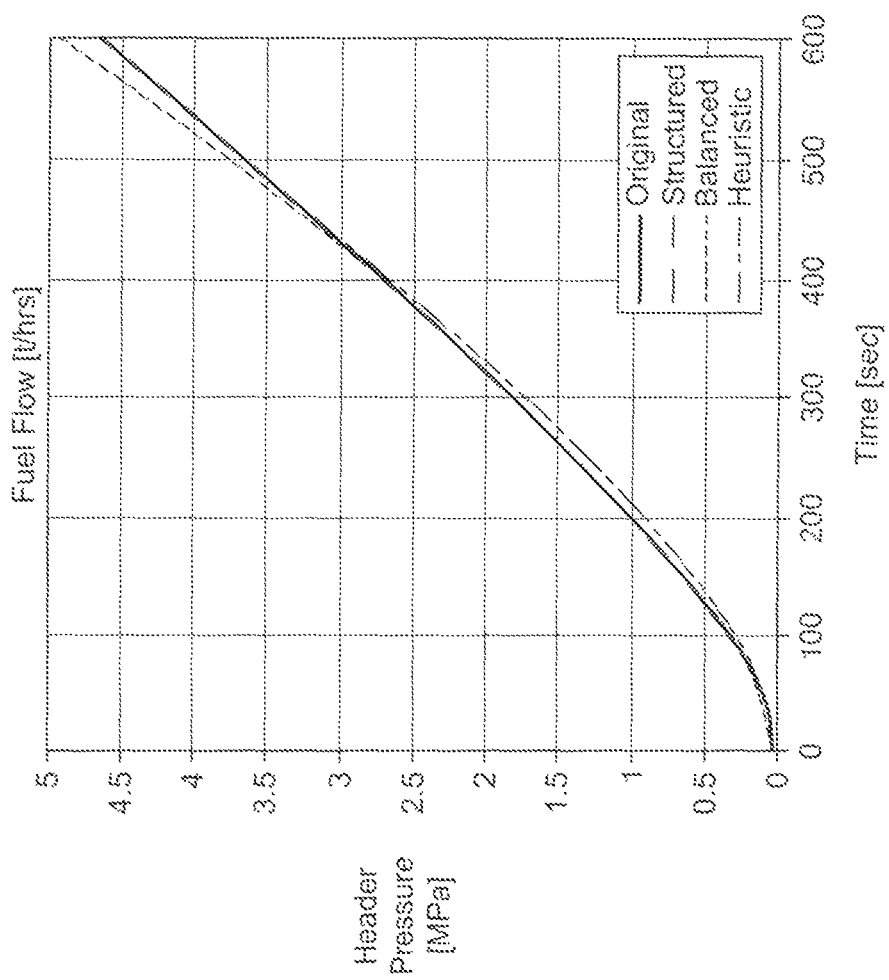
FIGS. 12a-12d and 13a-13d are data graphs of step responses and frequency responses, respectively, for an example system having five boilers.
Figure 12B:
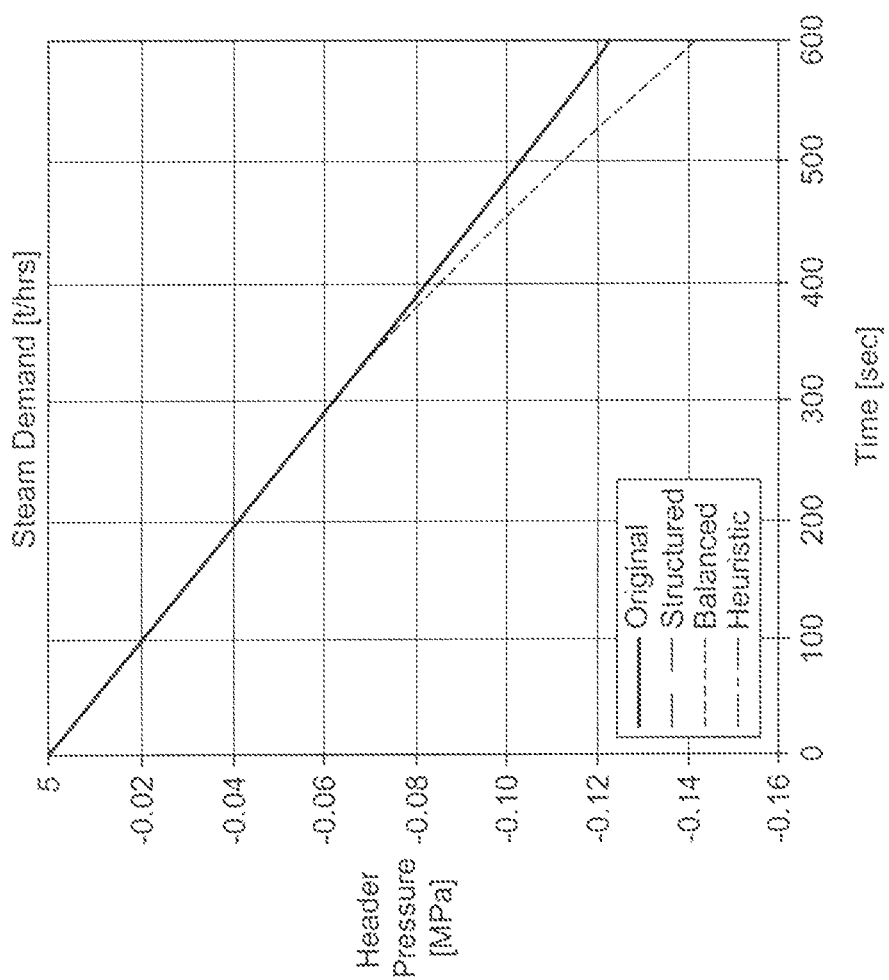
Figure 12C:
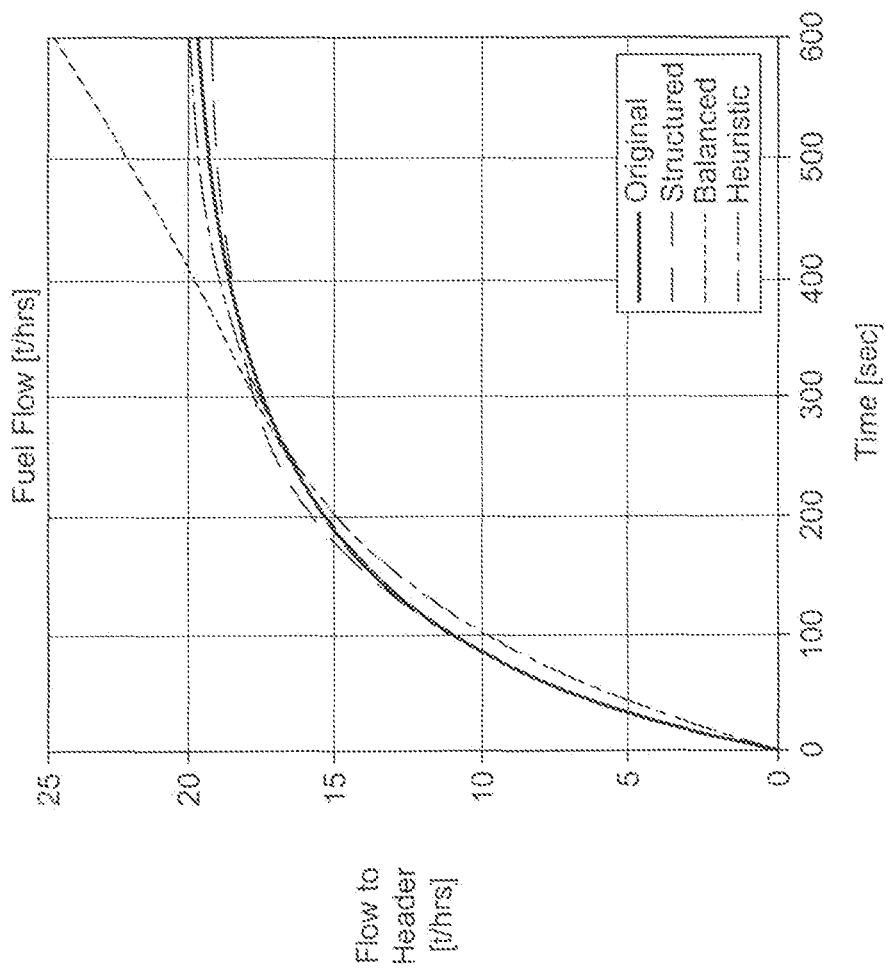
Figure 12D:
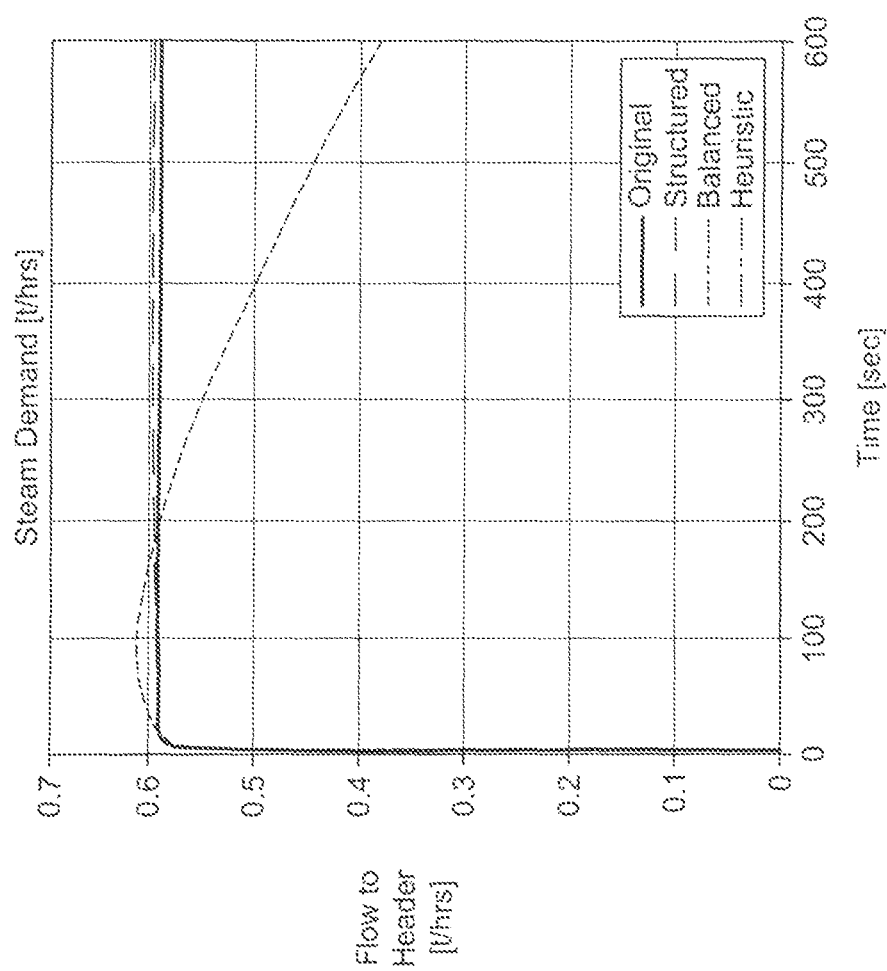
Figure 13A:
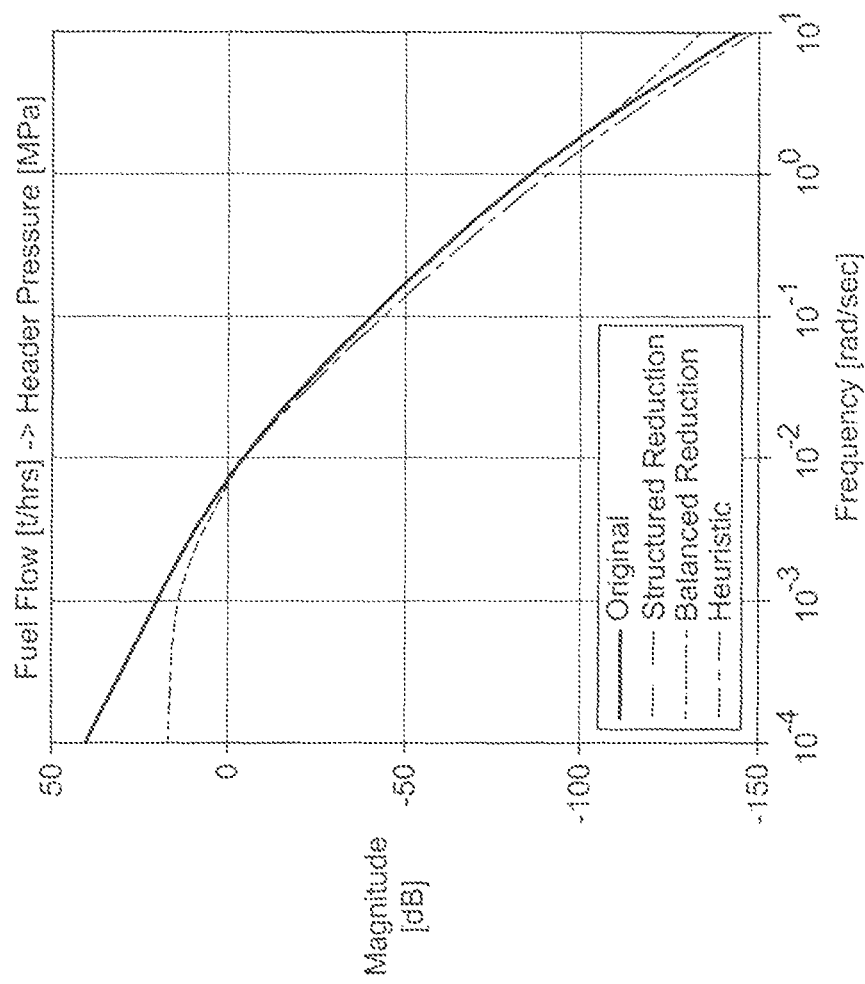
Figure 13B:
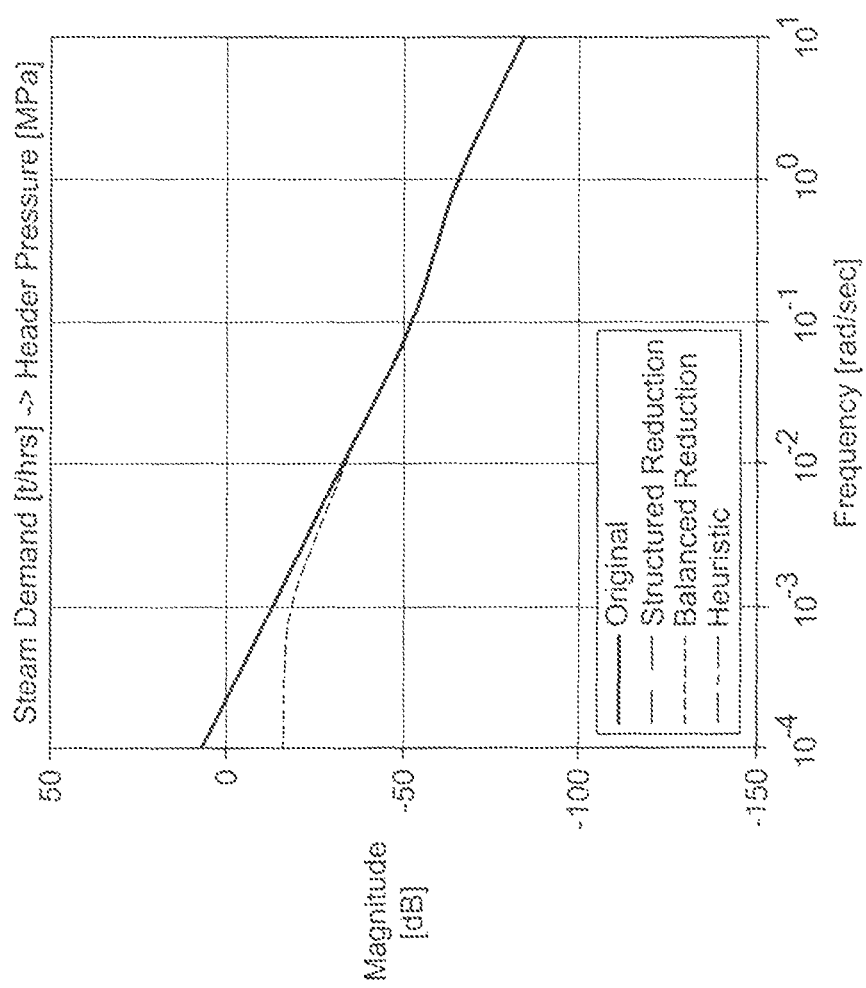
Figure 13C:
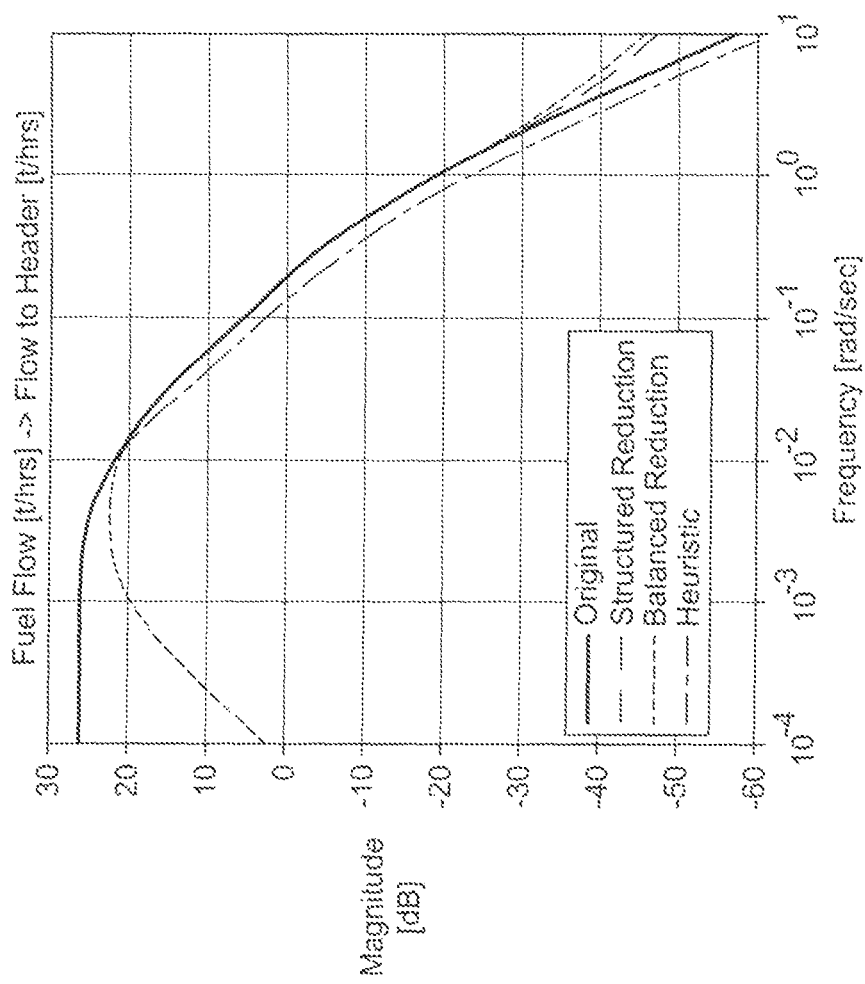
Figure 13D:
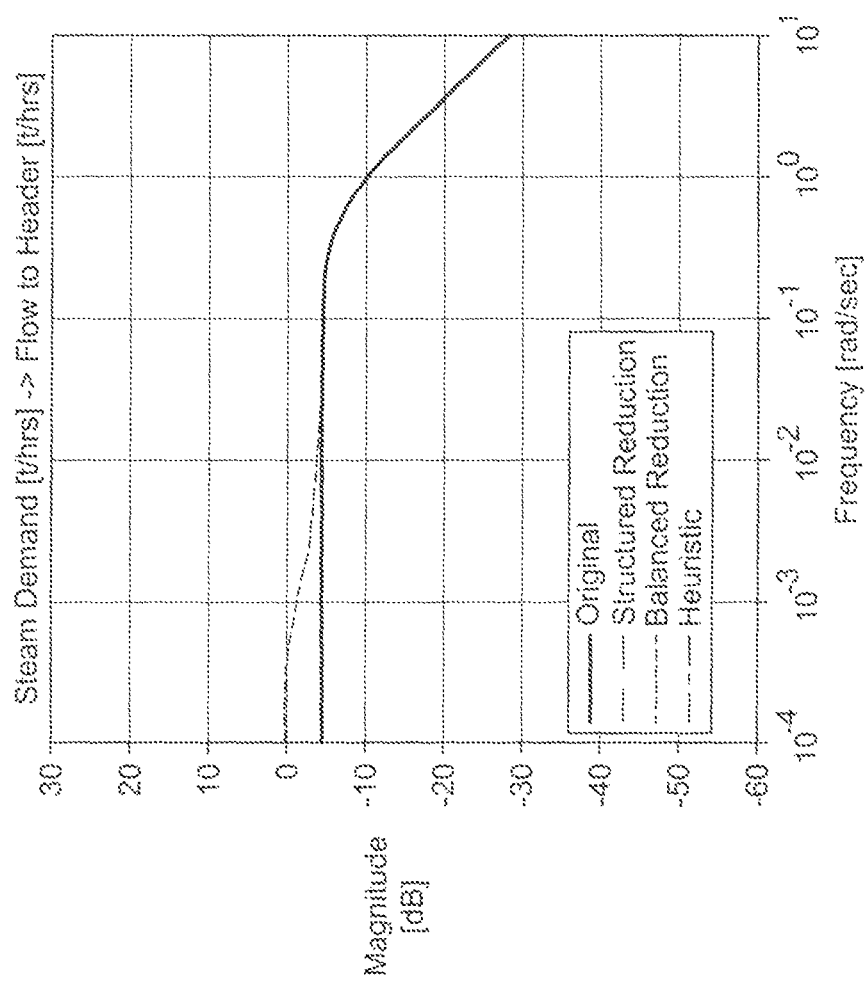

FIGS. 12a-12d and 13a-13d are graphs of data of step responses and frequency responses, respectively, for an example of five boilers (no ID). A solid line, a dashed line, a dotted line and a dash-dot line, represent original, structured, balanced and heuristic data plots, respectively. FIG. 12a shows header pressure (MPa) versus time (sec) for fuel flow (t/hrs). FIG. 12b shows header pressure versus time (sec) for steam demand (t/hrs). FIG. 12c shows flow to header (t/hrs) versus time (sec) for fuel flow (t/hrs). FIG. 12d shows flow to header (t/hrs) versus time (sec) for steam demand (t/hrs). FIG. 13a shows magnitude (dB) versus frequency (rad/sec) for fuel flow (t/hrs)→header pressure (MPa). FIG. 13b shows magnitude (dB) versus frequency (rad/sec) for steam demand (t/hrs)→header pressure (MPa). FIG. 13c shows magnitude (dB) versus frequency (rad/sec) for fuel flow (t/hrs)→flow to header (t/hrs). FIG. 13d shows magnitude (dB) versus frequency (rad/sec) for steam demand (t/hrs)→flow to header (t/hrs).

In general, the present approach may provide a solution to modeling of plants with parallel working units which may allow one to: 1) Significantly reduce time and resources needed for identification of a plant model for different on/off configurations (a number of required identification experiments (step test) is equal to the number of parallel units); and 2) Improve results of currently used heuristics in quality and mainly in quality consistency.

To recap, the present system for a reduced order model for advanced process control may incorporate a plurality of parallel units having enablement devices, a remaining system without the plurality of units but having an output and an input, and a summer having a plurality of inputs connected to outputs of the plurality of units and having an output connected to the input of the remaining system. An input of each unit of the plurality of units may be connected to the output of the remaining system.

The system may incorporate a mechanism which provides an approach for applying a structured model reduction on the system. The approach for applying the structured model reduction may incorporate performing an identification experiment on each unit of the plurality of units, computing parameters of a model for each unit from the data of a corresponding identification experiment, computing parameters of a model for the remaining system from data of an identification experiment, combining selected models of the plurality of units in a closed loop with the model of the remaining system to result in a whole system model, and performing a structured model reduction on the on the whole system model. Selected models may be determined according to a configuration of enablement devices. The structured model reduction may result in a reduced order model for advance process control.

An instance of the system may be where each unit is a boiler, and the remaining system has a header and interconnections. A switch or an enablement device of each unit may be a valve. Other instances beside a boiler setup may be implemented within the present system.

An approach for enabling parallel working units of a system for advance process control may have a model identification phase and a model combination phase. The model identification phase may incorporate determining models of parallel units of a system and a model of a remaining system which has no units. The model combination phase may incorporate a model of a whole system having the models of the parallel units and the model of the remaining system.

Determining models of parallel units may incorporate performing an identification experiment of each unit of the parallel units where the unit subject to the experiment is the only one enabled in that the other units are disabled. Parameters may be computed from data of the identification experiment for each unit, and a model of each unit may be extracted from the parameters.

Likewise, determining a model of the remaining system may incorporate computing parameters from data of an experiment and extracting the model of the remaining system from the parameters. The model combination phase may incorporate a configuration that indicates the enabled units and non-enabled units of the parallel units.

An approach may also incorporate computing a combination of models of units enabled according to the configuration with the model of the remaining system, and applying a structured model reduction to the combination of parallel models according to the configuration and the model of the remaining system to obtain a reduced order model. The reduced order model may be provided to an advanced process control controller.

An algorithm may facilitate the model combination phase. Various algorithms may be used in the present approach. An algorithm may deal with models of each of the parallel units, a model of the remaining system, and inputs of the configuration of the units. An instance of the algorithm may incorporate combining models of parallel units to a single state-space model according to the configuration, combining the state-space model with the model of the remaining system to a single model of dynamics of the whole system for the configuration, computing a controllability factor and an observability factor for the single model of the whole system, separating the controllability factor and the observability factor according to several dimensions, computing a Cholesky factor of the controllability factor, computing a singular value decomposition, computing a transformation matrix, applying the transformation matrix to get a reduced state-space model of the parallel units as a truncation or a singular perturbation, and/or combining the reduced state space model of the parallel units with the model of the remaining system to get a final model for advanced process control.

To summarize, it may be noted that an approach for providing a reduced order model for an advanced process control, may involve a model identification phase and a model combination phase. The model identification phase may incorporate obtaining models of each unit of a plurality of parallel units of a system and a model of a remaining system generally having no unit of the plurality of parallel units. The model combination phase may incorporate combining models of units that constitute a configuration and the model of the remaining system to obtain a whole system model. The whole system model may be subject to a structured model reduction to a reduced order model for advanced process control. The providing a reduced order model for an advanced process control may be embedded in the system.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for operating parallel boilers of an industrial system with advanced process control, the method comprising:
    developing a model for advanced process control, the model comprising:
        a model identification phase; and
        a model combination phase; and
    wherein:
        the model identification phase comprises determining models of each parallel unit of a system by performing an identification experiment of each unit of the parallel boilers where each unit is individually enabled while the other boilers are disabled and a model of a remaining system which has no boilers; and
        the model combination phase comprises a model of a whole system incorporating the models of the parallel boilers and the model of the remaining system;
    programming the model into an embedded microcontroller; and
    operating the parallel boilers with the microcontroller in accordance with the model for advanced process control.

2. The method of claim 1, wherein determining models of parallel boilers comprises:
    computing parameters from data of the identification experiment for each unit; and
    extracting a model of each unit from the parameters.

3. The method of claim 2, wherein determining a model of the remaining system comprises computing parameters from data of an experiment and extracting the model of the remaining system from the parameters.

4. The method of claim 3, wherein the model combination phase comprises a configuration of enabled boilers and non-enabled boilers of the parallel boilers.

5. The method of claim 4, further comprising computing a combination of models of boilers enabled according to the configuration with the model of the remaining system.

6. The method of claim 5, further comprising applying a structured model reduction to the combination of parallel models according to the configuration and the model of the remaining system to obtain a reduced order model.

7. The method of claim 6, further comprising providing the reduced order model to an advanced process control controller.

8. The method of claim 5, wherein an algorithm facilitates the model combination phase.

9. The method of claim 8, wherein assumptions for the algorithm comprise:
models of each of the parallel boilers;
a model of the remaining system; and
inputs for the algorithm comprising the configuration of the boilers.

10. The method of claim 9, wherein the algorithm comprises:
combining models of parallel boilers to a single state-space model according to the configuration;
combining the state-space model with the model of the remaining system to a single model of dynamics of the whole system for the configuration;
computing a controllability factor and an observability factor for the single model of the whole system;
separating the controllability factor and the observability factor according to several dimensions;
computing a Cholesky factor of the controllability factor;
computing a singular value decomposition;
computing a transformation matrix;
applying the transformation matrix to get a reduced state-space model of the parallel boilers as a truncation or a singular perturbation; and/or
combining the reduced state space model of the parallel boilers with the model of the remaining system to get a final model for advanced process control.

11. A method for operating a plurality of parallel boiler units in accordance with a reduced order model for an advanced process control of an industrial process, comprising:
developing a model for advanced process control, the model comprising:
a model identification phase; and
a model combination phase;
wherein the model identification phase comprises obtaining models of each unit of a plurality of parallel boiler units of a system by performing an identification experiment of each unit of the parallel boiler units where each boiler unit is individually enabled while the other boiler units are disabled and a model of a remaining system which has no unit of the plurality of parallel boiler units;
programming the model into an embedded microcontroller; and
operating the parallel boilers with the microcontroller in accordance with the model for advanced process control.

12. The method of claim 11, wherein the model combination phase comprises combining models of boiler units that constitute a configuration and the model of the remaining system to obtain a whole system model.

13. The method of claim 12, wherein the whole system model is subject to a structured model reduction to a reduced order model for advanced process control.

14. The method of claim 13, wherein the providing a reduced order model for an advanced process control is embedded in the system.

15. A method for operating parallel boiler units of an industrial system with advanced process control, comprising:
developing a model for advanced process control, the model comprising:
a model identification phase comprising determining models of parallel boiler units of a system and a model of a remaining system which has no unit; and
a model combination phase comprising a model of a whole system incorporating the models of the parallel boiler units and the model of the remaining system; and
wherein:
wherein an algorithm facilitates the model combination phase, the algorithm comprising:
combining models of parallel boiler units to a single state-space model according to the configuration;
combining the state-space model with the model of the remaining system to a single model of dynamics of the whole system for the configuration;
computing a controllability factor and an observability factor for the single model of the whole system;
separating the controllability factor and the observability factor according to several dimensions;
computing a Cholesky factor of the controllability factor;
computing a singular value decomposition;
computing a transformation matrix;
applying the transformation matrix to get a reduced state-space model of the parallel boiler units as a truncation or a singular perturbation; and/or
combining the reduced state space model of the parallel boiler units with the model of the remaining system to get a final model for advanced process control;
programming the final model into an embedded microcontroller; and
operating the parallel boilers with the microcontroller in accordance with the model for advanced process control.

* * * * *